(12) United States Patent
Gu et al.

(10) Patent No.: US 9,213,826 B2
(45) Date of Patent: Dec. 15, 2015

(54) SYSTEM AND METHOD TO PROTECT JAVA BYTECODE CODE AGAINST STATIC AND DYNAMIC ATTACKS WITHIN HOSTILE EXECUTION ENVIRONMENTS

(75) Inventors: Yuan Xiang Gu, Ottawa (CA); Garney Adams, Sittsville (CA); Jack Rong, Kanata (CA)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 13/499,495

(22) PCT Filed: Nov. 12, 2010

(86) PCT No.: PCT/CA2010/001761
§ 371 (c)(1),
(2), (4) Date: Jun. 6, 2012

(87) PCT Pub. No.: WO2011/057393
PCT Pub. Date: May 19, 2011

(65) Prior Publication Data
US 2012/0246487 A1    Sep. 27, 2012

Related U.S. Application Data

(60) Provisional application No. 61/260,887, filed on Nov. 13, 2009.

(51) Int. Cl.
*G06F 21/51* (2013.01)
*G06F 21/14* (2013.01)

(52) U.S. Cl.
CPC .............. *G06F 21/51* (2013.01); *G06F 21/14* (2013.01)

(58) Field of Classification Search
CPC ....... G06F 21/14; G06F 21/10; G06F 21/602; G06F 21/604; G06F 21/64; G06F 21/125
See application file for complete search history.

(56) References Cited

U.S. PATENT DOCUMENTS

| 6,070,239 | A | 5/2000 | McManis | |
|---|---|---|---|---|
| 6,668,325 | B1 | 12/2003 | Collberg et al. | |
| 6,779,114 | B1 * | 8/2004 | Gu et al. | 713/189 |
| 7,020,882 | B1 * | 3/2006 | Lewallen | 719/328 |
| 7,397,916 | B2 | 7/2008 | Johnson | |
| 7,590,863 | B2 | 9/2009 | Lambert | |
| 2004/0039926 | A1 * | 2/2004 | Lambert | 713/189 |
| 2007/0168670 | A1 * | 7/2007 | Dean et al. | 713/176 |

(Continued)

FOREIGN PATENT DOCUMENTS

DE   102007045743 A1 *  4/2009
EP       2196934 A1      6/2010

(Continued)

OTHER PUBLICATIONS

Chen, et al. "Java JNI Bridge: A Framework for Mixed Native ISA Execution", 2006, IEEE, p. 1-11.*

*Primary Examiner* — Michael R Vaughan
(74) *Attorney, Agent, or Firm* — Marc S. Kaufman; Amardeep S. Grewal; Reed Smith LLP

(57) ABSTRACT

A method and system that provides secure modules that can address Java platform weaknesses and protect Java bytecode during execution time. The secure modules are implemented in C/C++ as an example. Because implementation of the security modules is made in C/C++, this enables use of security technology that secures C/C++ software code.

25 Claims, 18 Drawing Sheets

(56) References Cited

U.S. PATENT DOCUMENTS

2007/0192595 A1* 8/2007 DaCosta ........................ 713/165
2009/0138731 A1   5/2009 Jin et al.
2010/0146304 A1* 6/2010 Miyatake et al. ............. 713/194
2010/0205459 A1* 8/2010 Schwarz ....................... 713/190
2011/0239307 A1* 9/2011 Joffray et al. .................. 726/26

FOREIGN PATENT DOCUMENTS

| JP | 2005293109 A | 10/2005 |
| JP | 2009258772 A | 11/2009 |
| WO | 2007147495 A2 | 12/2007 |
| WO | 2009095838 A1 | 8/2009 |

* cited by examiner

SYSTEM AND METHOD TO PROTECT JAVA BYTECODE CODE AGAINST STATIC AND DYNAMIC ATTACKS WITHIN HOSTILE EXECUTION ENVIRONMENTS

This application is the National Stage of International Application No. PCT/CA2010/01761, filed Nov. 12, 2010.

FIELD OF THE INVENTION

The present invention relates generally to computer software, and more specifically, to a method and system of making computer software resistant to static and dynamic attacks within a hostile execution environment.

BACKGROUND OF THE INVENTION

Within the computer programming industry, the Java programming language is used in every major industry segment and has a presence in a wide range of devices, computers, and networks. Java applications are written in the Java programming language and compiled into machine-independent bytecodes that are executed on a Java Virtual Machine (JVM), which is deployed on a host Operating System (OS) and the host Computer Processing Unit (CPU) Instruction Set Architecture (ISA). Java technology's versatility, efficiency, platform portability, and security make it the ideal technology for network computing. The Java programming language is found everywhere from laptops to datacenters, game consoles to scientific supercomputers, and cell phones to the Internet. Indeed, portability, extensibility, generality, and reliability are key Java strengths. However, such ubiquity also provides ample opportunity for hackers and related computer attacks.

To prevent attacks and unauthorized access to the Java environment from un-trusted applications, Java technology includes the Java sand-box security model for protecting the execution environment of the host machine or device where compromised software such as viruses or malware may be downloaded or installed illegally. Preventing such hostile attacks is essential in designing critical applications that normally run on highly protected environments and systems such as telecommunication systems, transportation systems, defense systems, industrial automation systems, and power management systems. Each year, more and more such critical systems are designed and implemented using the Java programming language.

Likewise, the consumer electronics industry is entering a new age where advanced technologies and products, rapid demand on media digitalization, and the continuously falling prices of consumer electronics taken together with increasing disposable income from emerging markets have spurred growth in the consumer electronics market at a speed and scope without precedent. Many such consumer electronics products rely on software applications to function. Certain Java programming language strengths (such as portability, extensibility, generality, reliability, and simplicity) reduces overall development and deployment cost of consumer electronics products, thereby ensuring more and more Java-based platforms and applications are deployed to new consumer products.

Almost all consumer electronics devices require functioning in an un-trusted environment. In un-trusted environments, software within consumer electronics devices can be directly accessed for different purposes ranging from a beneficial reason (e.g., to get needed services) to undesirable reasons (e.g., to hack the devices). As a result, more and more computer applications execute in a relatively hostile environment than ever before. For example, hand-held devices (such as portable media players or smart phones), home networking (such as set-top boxes, media players, or personal computers), and web-based environments are areas where attackers often spend large amounts of time and resources. Therefore, the protection of legitimate software against attacking software is becoming an escalating arms race. Moreover, high performance hardware and sophisticated attack tools provide the intruders with many new advantages.

Software distributors must be sure that their software is robust and resistant to attack. However, the given platform and software are often well known to an attacker who has time, resources, tools, and all the experts on the web at the disposal of the attacker. This hostile attack landscape is often termed a "white box" environment, where all the content is in plain sight and therefore subject to direct access and tampering. This is the opposite of a "black-box" environment which is, in the other words, a trusted and protected environment where content is hidden or otherwise protected from attack. In the prevailing hostile landscape of a white box environment, preventing or stopping direct and automated attacks to software systems is becoming one of the most demanding security challenges. Moreover, strong defenses for white box attacks must be achieved to ensure proper and secure device function. The Java programming language is not adequately designed to tackle such security problems and challenges. In this respect, certain Java strengths actually cause security weaknesses when compared to programming in C or C++.

Unlike C/C++ compilers that compile C/C++ code to a low-level instruction set which operates on raw binary data and is specific to the target hardware (such as x86 or PowerPC), a Java compiler compiles Java source code to a higher-level portable bytecode that operates on classes and primitive types that the JVM can interpret during execution. Platform dependency is encapsulated within JVM and decoupled from the Java application.

As well, the standard Java compiler does not perform compile-time optimizations that are commonly and usually found in C/C++ compilers. Instead, Java relies on Just-In-Time (JIT) compilation to perform all optimizations at run time while taking the execution profile into account for performance improvement. Major C/C++ code optimizations are performed at compile time. For example, inline substitution results in copies of the given (member) function being scattered around the binary image; use of the preprocessor combined with compile-time evaluation of expressions may leave no trace of the constants defined in the source code; and so on. In general, sophisticatedly optimized code is more difficult to reverse engineer.

Still further, Java program dependencies are resolved at run time when classes are loaded. So the name of the class and names of its methods and fields must be present in a class file, as well as names of all imported classes, called methods, and accessed fields. On the other hand, C/C++ programs are statically linked. Therefore, the names of classes, members, and variables need not be present in the compiled and linked program, except for names exported from dynamic libraries.

Finally, a Java application is delivered as a set of Java Archive (JAR) files. The JAR format enables multiple files to be bundled into a single archive file, which are essentially non-encrypted archives and from which it is relatively easy to extract individual classes. By comparison, a C/C++ application is delivered as a monolithic executable that may link with a few dynamic libraries, so it is not as easy to identify program information and individual code.

Accordingly, the decompilation of Java bytecode to Java source is much simpler and easier than dissembling C/C++ and can therefore be fully automated. Program information such as class hierarchy, statements, names of classes, methods and fields can all be retrieved from the bytecode. Although there are many freeware and commercial Java obfuscation tools available, none provide protection to prevent a direct attack to execution of the bytecode. As a result, Java reverse engineering is now a common practice.

Moreover, a JVM provides an open run time environment for Java applications. There is very little built-in security to protect the JVM and make the JVM itself robust. Attaching to a JVM itself or using a JVM to launch attacks is relatively trivial. Therefore, regardless of the strength of protections applied to Java application code, hackers may always use the JVM as the weakest link in order to implement white box attacks because of the JVM's vulnerability. Although a more trusted and robust JVM would likely protect Java applications and prevent white box attacks, this approach would require significant changes to the current Java security model and related significant industry support and adaptation. It would therefore be desirable to have a trusted and robust component within industrial standard JVM that protects applications within a white box environment.

SUMMARY OF THE INVENTION

It is an object of the present invention to obviate or mitigate a major disadvantage of previous Java platform configurations.

This disclosure presents an invention that provides secure modules that can address Java platform weaknesses and protect Java bytecode during execution time. The secure modules are implemented in C/C++ as an example. Because implementation of the inventive security modules is made in C/C++, this enables use of security technology that secures C/C++ software code. For purposes of the present invention, suitable security technology is that provided by Cloakware Inc. of Ottawa, Ontario, Canada. Such suitably intended security technology is described fully within prior commonly owned United States Patents including: U.S. Pat. No. 7,506,177 issued on 17 Mar. 2009 to Chow et al. and titled TAMPER RESISTANT SOFTWARE ENCODING AND ANALYSIS; U.S. Pat. No. 7,464,269 issued on 9 Dec. 2008 to Johnson et al. and titled SECURE METHOD AND SYSTEM FOR HANDLING AND DISTRIBUTING DIGITAL MEDIA; U.S. Pat. No. 7,397,916 issued on 8 Jul. 2008 to Johnson et al. and titled SYSTEM AND METHOD FOR PROTECTING COMPUTER SOFTWARE FROM A WHITE BOX ATTACK; U.S. Pat. No. 7,395,433 issued on 1 Jul. 2008 to Chow et al. and titled METHOD AND SYSTEM FOR SUSTAINABLE DIGITAL WATERMARKING; U.S. Pat. No. 7,350,085 issued on 25 Mar. 2008 to Johnson et al. and titled TAMPER RESISTANT SOFTWARE-MASS DATA ENCODING; U.S. Pat. No. 7,325,141 issued on 29 Jan. 2008 to Chow et al. and titled METHOD AND SYSTEM FOR SECURE ACCESS; U.S. Pat. No. 6,842,862 issued on 11 Jan. 2005 to Chow et al. and titled TAMPER RESISTANT SOFTWARE ENCODING; U.S. Pat. No. 6,779,114 issued on 17 Aug. 2004 to Chow et al. and titled TAMPER RESISTANT SOFTWARE-CONTROL FLOW ENCODING; and U.S. Pat. No. 6,594,761 issued on 15 Jul. 2003 to Chow et al. and titled TAMPER RESISTANT SOFTWARE ENCODING; each of which patents are herein incorporated in their entirety by such reference made here.

The existing software security technology disclosed in the above-referenced patents and related products from Cloakware, Inc. are used to protect legitimate applications along with the functionality and intellectual property of the applications, which run on hostile (un-trusted) execution environments, in order to prevent white box attacks to these applications. Such existing software security technology contains practical source code and binary protection tools that protect applications in C/C++ along with native compiled code and make software and security inseparable by enhancing traditional application building processes.

In a first embodiment, the present invention provides an apparatus for increasing tamper-resistance of Java bytecode, including: a protection tool for applying security to Java bytecode during build-time; a security module accepting secured Java bytecode from the protection tool and launching the secured Java bytecode during run-time; and one or more protection mechanisms integrated with the protection tool and the security module; wherein one or more protection mechanisms operate to counter static and dynamic attacks to the Java bytecode.

In a further embodiment of the present invention, the apparatus also includes a secured Java bytecode including a protected Java application bytecode stub, a protected application payload, and an encrypted class bytecode frame, each of which being formed by said protection tool during build-time.

In another embodiment of the present invention, the security module is distributed independently as a functional extension to a Java virtual machine environment to provide a root of trustiness of protected Java applications, and the secured Java bytecode is distributed separately as per user needs.

In a further embodiment of the present invention, the protection tool has a mechanism to dictate that the protected application payload is launched via said protected Java application bytecode stub.

In a further embodiment of the present invention, the security module includes a protected bytecode class loader and the protection tool includes a mechanism to dictate that said protected application payload is launched via said encrypted class bytecode frame using the protected bytecode class loader.

In a further embodiment, the apparatus is formed of programming engines implemented in a programming language including one or more of C, C++, and Java.

In a further embodiment, the apparatus is formed of programming engines implemented in a programming language capable of interfacing with a Java virtual machine.

In a further embodiment, one or more of the protection mechanisms are selectable according to configuration options. These protection mechanisms may also include static security handlers formed within the protection tool and dynamic security handlers formed with the security module.

In a further embodiment, the static security handlers may include a whitebox (WB) static security handler for accepting cryptographic information including cryptographic keys from a user so as to generate: WB encryption key data used by one or more of other the static security handlers, and WB decryption key data and a WB security module utility, each used by one or more the dynamic security handlers during dynamic run-time protection of the security module.

In a further embodiment, the static security handlers may include a bytecode integrity verification (BIV) static security handler for applying hash code protection to the secured Java bytecode in response to protection marking information, and the dynamic security handlers includes a BIV dynamic security handler for verifying the hash code protection at run-time, wherein the security module invokes tampering countermeasures upon verification failure.

In a further embodiment, the apparatus further includes static security handlers which may include a secure loading bytecode (SLB) static security handler for forming during build-time a protected Java application bytecode stub, a protected application payload, and an encrypted class bytecode frame, and the dynamic security handlers includes an SLB dynamic security handler for loading into a memory buffer said encrypted class bytecode frame corresponding to the secured Java application bytecode, decrypting each of encrypted class contained within the encrypted class bytecode frame via said WB decryption key data corresponding to the encrypted class, loading each decrypted class bytecode into an application work space via a security module class loader so as to execute the Java application bytecode within the application work space.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
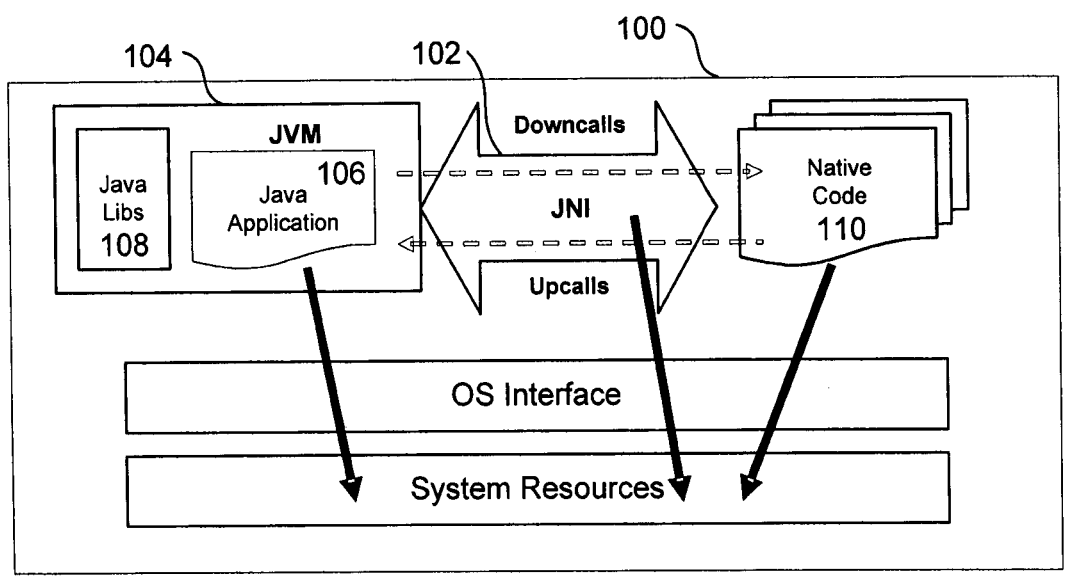
FIG. 1 is a diagram illustrating a known overview of the JNI bridging a Java application with native code.

As seen by way of FIG. 1, the Java platform 100 additionally includes a Java Native Interface (JNI) 102 that provides a facility to bridge two-way interoperations and interactions between the Java world (which includes a JVM 104, Java applications 106, and libraries 108 in bytecode loaded within the JVM) and the native code world 110 (which applications or shared libraries are written in other languages, such as C/C++/assembler, and compiled into the host CPU ISA). By using a JNI Application Programming Interface (API) in Java programming language and C/C++/assembler code, C/C++/assembler native binary code can be callable from Java and also can invoke Java bytecodes. There are two kinds of interactions: "down-calls" when a Java application code calls a native method and "up-calls" when a native method accesses data or invokes methods of the given Java application via a JNI environment.

At the run-time, the security modules of the present invention can co-execute within the JVM via the JNI so that the given Java application can invoke secure operations within the inventive security module where such secure operations can access the Java application and other Java library code loaded within the JVM and perform protections.

The approach of the present invention is effectively a security add-on to an existing JVM by introducing a security module that is fully protected and trusted within the JVM via the JNI mechanism. At run-time, the security module acts as the root of the trust and as a protection "trampoline and engine" within the JVM to launch and perform the various protections to Java bytecode. In this way, the present invention does not require any global changes to the existing Java platform. Rather, both existing and newly deployed systems and devices can benefit from this solution immediately. In the other words, the present invention may be treated as a security extension to existing Java infrastructure to address security problems faced by current Java applications. Thus, the present invention provides a Java bytecode protection security module that leverages the ability of the JNI to access bytecode during run-time and perform a set of protection methods to Java bytecode in response to static and dynamic attacks to the Java application.

The present invention provides a highly trusted protection tool and security module within a Java bytecode protection system. The present invention does not rely upon Java application protection based only on the JVM and Java security. Rather, the present invention introduces a Java bytecode protection security module (SM) being a trusted zone that can work with the JVM via the JNI to launch, perform, and manage Java bytecode protection during run-time. The trustworthiness of the security module is guaranteed by applying known effective security protection to C/C++ code in which programming language the protection tool and security module are written. With such a trusted SM, trustworthiness is expanded from the SM to the Java applications and the JVM by certain protections provided by the SM discussed further herein.

Figure 2:
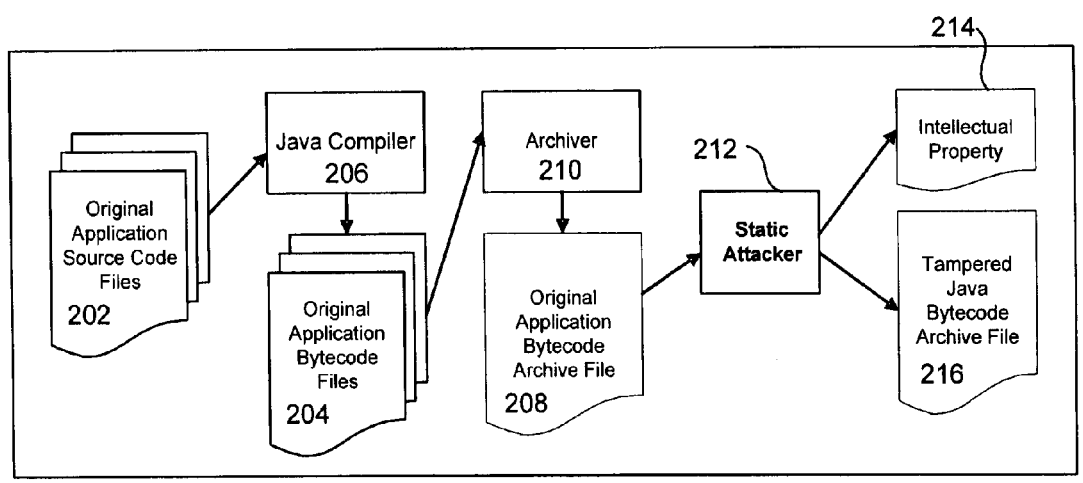
FIG. 2 is a diagram illustrating the known mechanism of static attacks to Java application bytecodes.
Figure 3:
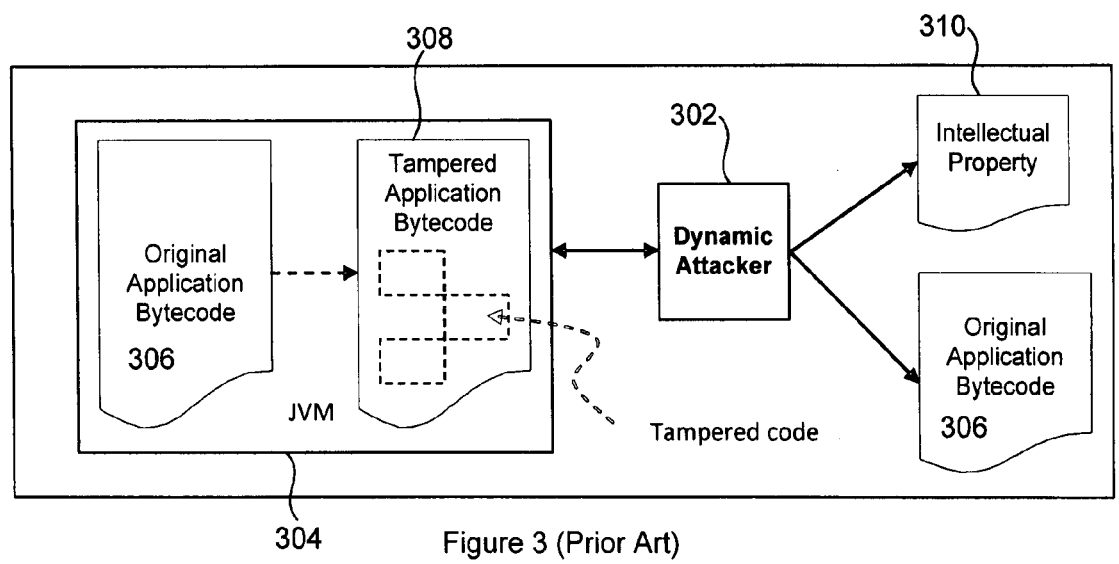
FIG. 3 is a diagram illustrating the known mechanism of dynamic attacks to Java application bytecodes.

With regard to FIGS. 2 and 3, typical static and dynamic attacks to java bytecode are illustrated. In general, any given Java application is developed in Java source form 202 and then compiled into Java bytecode 204 by a Java compiler 206, which is stored on an archive file 208 (i.e., JAR file) by using an archiver utility 210 prior to distribution. Such distribution may take many forms including media such as a Compact Disc (CD) or downloadable files.

A static attacker 212 normally uses reverse engineering tools (e.g., a Java decompiler) to extract valuable intellectual property information 214 (i.e., proprietary data or software algorithms) from the code from the distribution media. In doing so, the attacker may then make illegal changes to the code or otherwise compromise the underlying code 216. In order to prevent such static attacks to Java bytecode during the distribution of the given Java application, the present invention applies a level of protection to application bytecode. This protection is provided before distribution to ensure that static attacks become extremely difficult tasks. After applying effective protection by way of the present invention, the intellectual property embedded within the application bytecode is not easily reverse engineered and any tampering of the protected bytecode becomes an impractical exercise. Moreover, the static protection of the present invention is advantageous because any tampered bytecode cannot be loaded and run by a legitimate JVM.

In comparison to static attacks to an application bytecode, a dynamic attacker 302 can implement attacks to Java bytecode by using dynamic attack tools while a JVM is loading and running the Java application. By using dynamic attack tools and methods, an attacker can access the JVM 304 and application bytecode 306, observe and modify the bytecode 308 directly to understand or/and change original designated behavior and important values for their attack purpose. Moreover, the attacker can ascertain valuable intellectual property 310 and secrets from the bytecode including lifting original bytecode 306. In order to prevent such dynamic attacks to Java code during run-time, the present invention forms and implants protection to the application bytecode before distribution. Moreover, the present invention implements those protections during run-time to ensure any dynamic attacks are impractical. The present invention serves to not only prevent dynamic attacks, but also adds the ability to the protected application to detect dynamic attacks and be able to mitigate dynamic attacks as well as making such attacks very expensive efforts in terms of time and resources for any prospective attacker.

Figure 4:
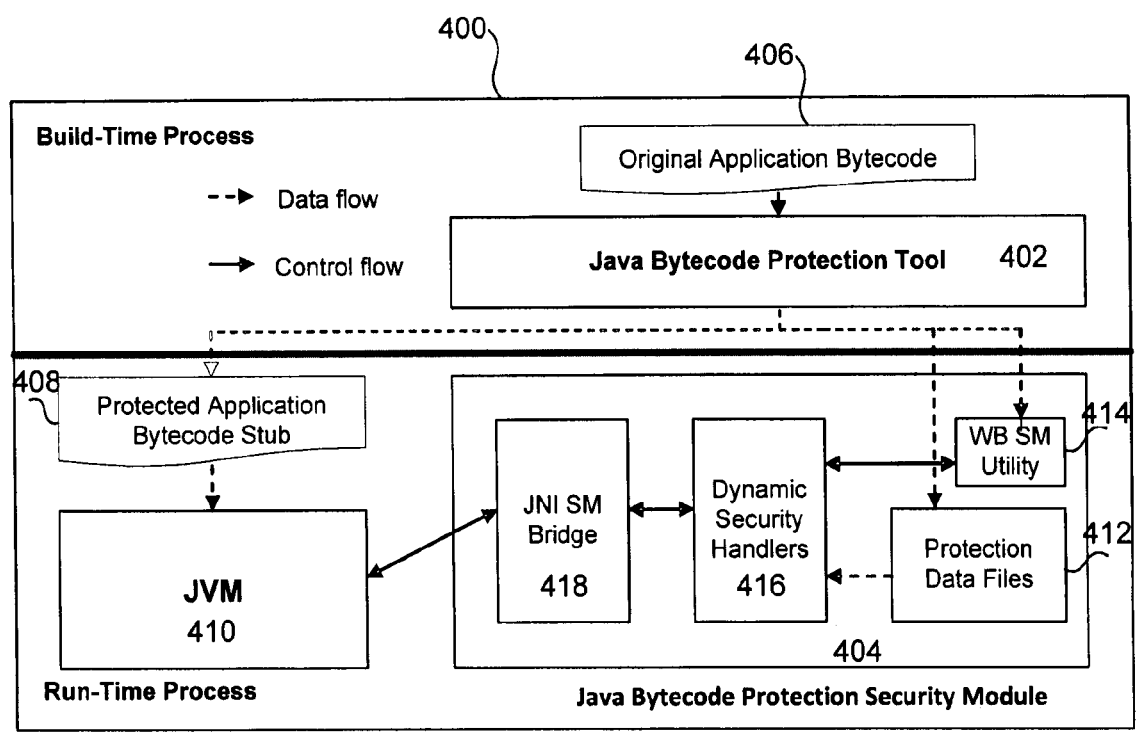
FIG. 4 is a diagram illustrating an overview of the Java bytecode protection system in accordance with the present invention.

FIG. 4 is an overview of a bytecode protection system 400 and related methods in accordance with the present invention. Here, the Java bytecode protection system includes two parts: a build-time protection tool 402 and a run-time security module 404. As mentioned, the bytecode protection system and related methods are implemented in C/C++ using technology available from Cloakware Inc. of Ottawa, Ontario, Canada as discussed above.

The Java bytecode protection tool 402 is used to apply security (i.e., "cloak") the Java bytecode 406 prior to deployment. This Java bytecode protection tool 402 allows the security settings and protection mechanisms to be specified during build time. This tool takes as input the original Java application bytecode 406, security specifications, and the WB cryptographic keys, and generates "cloaked" Java bytecode that is run in conjunction with the Java bytecode protection security module 404. The Java bytecode protection tool 402 includes options for specifying how bytecode is launched (e.g., via a Protected Application Bytecode Stub or a Protected Byetcode Class Loader), as well as options for specifying security techniques for the deployed secured Java bytecode. The cloaked bytecode of the Java application is distributed in two parts: 1) protected Java application bytecode stub 408, which is loaded into the target JVM environment 410, and 2) protected data files 412 and white box security module (WB SM) utility 414, which will be loaded and accessed by the SM during run-time, separately. The inventive Java bytecode protection security module 404 can be distributed with these two parts or independently up to application provisioning approaches. In general, the security module 404 is generic in the sense that it can be installed once and applied to the cloaked bytecode of any Java application.

A variety of methods for the inventive bytecode protection are enabled for use in conjunction with the instant Java bytecode protection system 400. Each such bytecode protection method address static and dynamic attacks to Java application in bytecode form.

One method of bytecode protection includes White box cryptographic, or "WB cryptographic," which is a unique cryptographic technology that protects cryptographic algorithms so that their operations can execute within a hostile environment without leaking a cryptographic key and other cryptographic values. In other words, the WB cryptographic method can be executed against direct attacks. The present invention incorporates two kinds of WB cryptographic technology including the external WB cryptographic library and the internal WB cryptographic facility.

The external WB cryptographic library is implemented in C and protected with tampering resistance property by a hidden cryptographic key and other cryptographic information so that WB cryptographic operation can be used by protected Java applications and performed without releasing any valuable information including the key. The inventive internal WB cryptographic facility is a functional component of the build-time protection tool 402 that accepts cryptographic information and keys, and generates WB key data and utilities for the inventive protection tool and security module 404 to use to encrypt and decrypt different forms of java application bytecodes and relevant information.

Another inventive method of bytecode protection includes Bytecode Integrity Verification (BIV). Protection via BIV can detect and mitigate static and dynamic tampering attacks to Java class or method code while loading a class or running Java methods. At build time, the inventive method calculates static hash values of JAR files, class, and method bytecodes from the original application archive file. During loading and run-time, the inventive method calculates dynamic hash values by addressing class and method bytecode loaded with the JVM 410 and makes the integrity verification by checking the dynamic hash values against the static ones.

Another inventive method of bytecode protection includes Anti-Debug (AD) which is shown and described later in regard to FIG. 7. AD is one of the dynamic security handlers 416 as shown in FIG. 4. AD protection can prevent and detect dynamic attacks by using debuggers during run-time. AD consists of techniques that detect attacks by monitoring the internal and external state of the system environment at startup and during runtime. Appropriate countermeasures are invoked once the anti-debug attacks are detected.

Another inventive method of bytecode protection is Secure Loading Bytecode (SLB). This SLB protection method prevents and detects static reverse engineering and tampering attacks to archive file and Java class code before loading into the JVM 410. At build time, the SLB protection method encrypts JAR files and selected class bytecodes from the original application archive file, and introduces an application stub class. When a JVM 410 loads the protected application, the JVM 410 first loads the application stub class and then triggers loading of the protected application. An SLB dynamic security handler 416 described further herein below is a functional component of the inventive Java bytecode protection security module 404 that is connected with the JVM 410 via JNI 418 during run-time execution. The SLB dynamic security handler 416 manages and controls loading a protected Java application bytecode into the work space in the JVM 410.

Another inventive method of bytecode protection is Dynamic Bytecode Decryption (DBD). The DBD protection method prevents and mitigates dynamic attacks to Java class or method code during run-time.

Another set of inventive methods of bytecode protection includes both transfer-execution and partial execution. Both of these protection methods move part of original execution into the security module 404 and make sure that only part of execution can be exposed within the JVM 410 so as to prevent and mitigate dynamic code lifting attacks during run-time. For example, certain Java bytecode can be converted into C code (J2C) that can be protected and executed within the security module 404.

Another inventive method of bytecode protection includes bytecode transformation. This kind of protection can be achieved by techniques including data flow transformations and control flow transformations. Bytecode transformation can transform original bytecode into different code structure while still preserving the original functionality. The transformed bytecode becomes much harder to be reverse engineered and tamper resistant.

Figure 5:
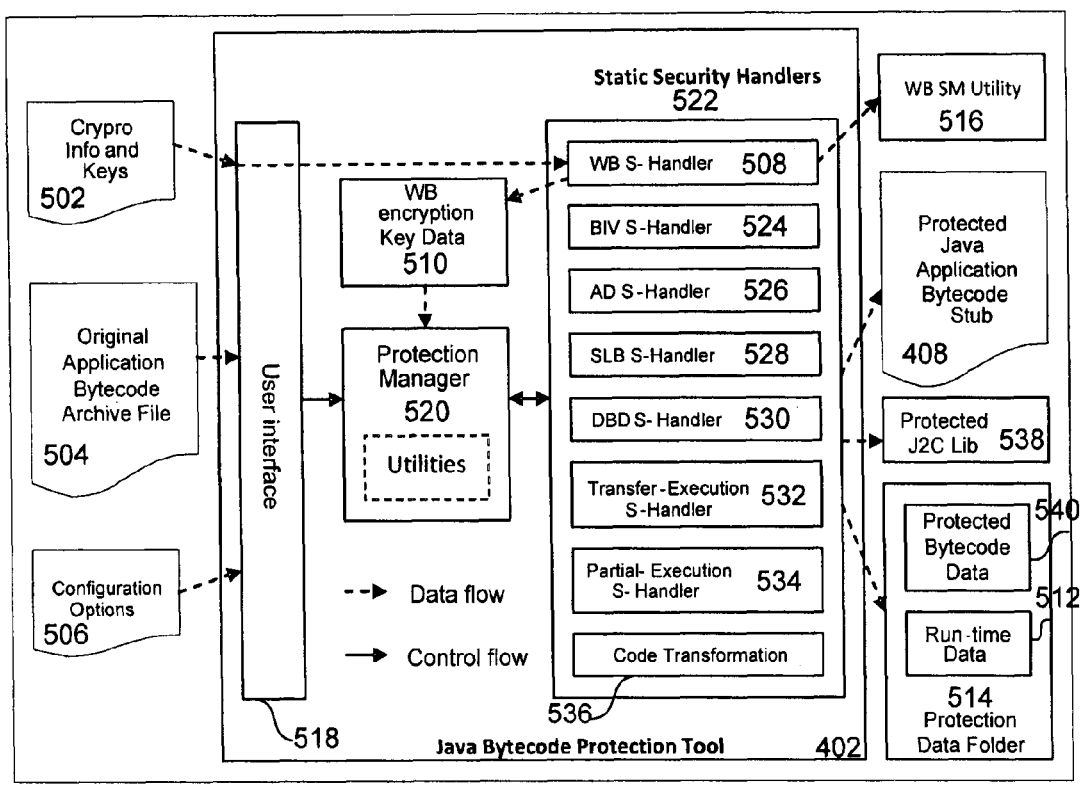
FIG. 5 is a diagram illustrating the build-time process, as shown in the top portion of FIG. 4, to protect Java application bytecodes at build-time in accordance with the present invention.

Referring to FIG. 5, the Java bytecode protection tool 402 applies different protection techniques to original application bytecode. The Java bytecode protection tool 402 thus generates protected bytecode and relevant data and utilities that work with the Java bytecode security module during run-time to implement those designated protection techniques to Java bytecode. The Java bytecode protection tool 402 accepts the three inputs of cryptographic info and keys 502, original JAR files 504, and configuration options 506 via the user interface 518 and performs the three kinds of operations.

The first basic operation includes generation of WB key data and utilities. Using cryptographic info and keys 502, the WB static handler 508 generates WB encryption key data 510 that are used by different static security handlers (each described in more detail herein below) and the tool itself. Also, the build-time process of the protection tool 402 generates WB decryption key data that is stored as part of run-time data 512 in a data protection folder 514. A WB Security Module (SM) utility 516 is provided to perform WB decryption operations invoked by the dynamic security handlers during run-time by using the WB decryption key data.

The second basic operation includes application of protection techniques. According to configuration options, the Java bytecode protection tool 402 applies different static security handlers to modify application bytecode from the original form to protected forms. In doing so, this operation generates protected Java application bytecode stub 408 and relevant protection data files that contain protected application bytecode in various protection forms and important run-time data.

The third basic operation includes packaging a deployable form of the protected Java bytecode. At the end of the process, the Java bytecode protection tool 402 will structure and pack all output files properly so that the Java application bytecode stub 408 can be loaded by the JVM 410. This Java application bytecode stub 408 is an entry point to launching the cloaked Java application and may take various forms including: a class file that can be launched by an external program, a class file that is launched by another Java class, or a Java class loader. The Java bytecode protection tool 402 will also structure and pack all output files properly so that the WB SM utility 516 can be invoked by functional components of the Java bytecode security module. Still further, the Java bytecode protection tool 402 will also structure and pack all output files properly so that all protection data files can be accessed by certain functional components of the Java bytecode security module 404.

FIG. 5 shows an overview of the aforementioned build-time process to protect Java application bytecodes. With regard to FIG. 5, the major functional components and data files will now be described.

The Java bytecode protection tool 402 includes a user interface 518 for interfacing with a user in order to accept user commands and major inputs. The commands and inputs may include: cryptographic info and keys 502 including cryptographic algorithm selection, and original key materials; original application bytecode archive file 504 which includes unprotected bytecode to be protected; and configuration options 506 which include user options to conduct the Java bytecode protection tool 402 on what and how to protect the application bytecode—e.g., a user can specify particular Java classes and methods whether to be protected or not.

The Java bytecode protection tool 402 also includes a protection manager 520. The protection manager 520 is provided to interpret configuration options 506, and coordinate different protection techniques in a dependent order so as to inter-lock them such that the resulting overall protection is much stronger than each individual protection. Also, the manager 520 contains utilities commonly used by other functional components of the Java bytecode protection tool 402.

The Java bytecode protection tool 402 also includes static security handlers 522. Each individual static handler is invoked by the protection manager 520 to perform a respective predetermined protection technique. In the illustrated embodiment, a WB-static handler 508, a BIV static handler 524, an AD static handler 526, a SLB static handler 528, a DBD static handler 530, a transfer-execution static handler 532, a partial-execution static handler 534 and a code transformation tool 536 are shown. Each such static security handler is described in detail in later sections herein below. The protection manager 520 and static security handlers 522 are designed such that they work together to provide a plug-in mechanism to add and extend security capability and new protection by easily integrating further new security handlers with the protection tool.

The Java bytecode protection tool 402 also includes WB encryption key data 510 generated by the WB static security handler 508. The WB encryption key data 510 is used by the manager 520 and static security handlers 522 to encrypt certain forms of bytecode and protection data.

The Java bytecode protection tool 402 also includes a WB SM utility 516 generated by the WB static security handler 510. The WB SM utility 516 is used by dynamic security handlers (described further herein below) within the security module 404.

The Java bytecode protection tool 402 also includes a protected Java application bytecode stub 408. The stub 408 only contains a boot-strap of the protected Java application for the JVM 410 to load first and then trigger a secure bytecode loader function to load real protected bytecode from protection data files.

The Java bytecode protection tool 402 also includes a protected J2C library 538 generated by the tool. The protected J2C library 538 contains various protected code in C that have been converted from Java bytecode. This library is dynamically linked and invoked by the Java bytecode security module.

The Java bytecode protection tool 402 also includes protected bytecode data 540. This protected bytecode data 540 is one kind of protection data file generated by the tool and contains various protected bytecode.

The Java bytecode protection tool 402 also includes run-time data 512. This run-time data 512 contains various kinds of security related information, such as, but not limited to, WB decryption key data, integrity verification static hash values, protected class and method information and tables.

It should also be understood that the Java bytecode protection tool 402 exhibits downloadability. As such, all outputs (including the protected java application bytecode stub 408, protected J2C library 538, protected bytecode data 540 and run-time data 512) from this protection tool are downloadable during run-time.

Figure 6:
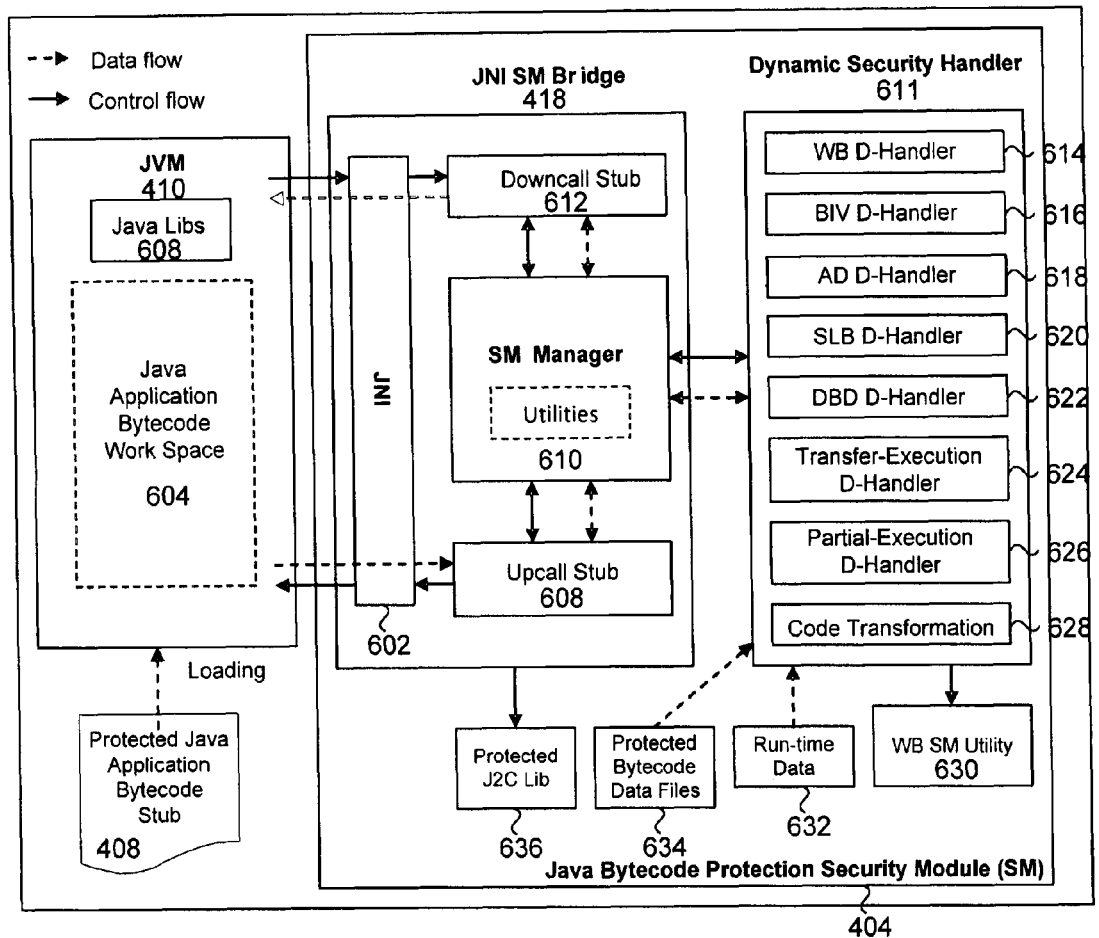
FIG. 6 is a diagram illustrating the run-time process, as shown in the bottom portion of FIG. 4, to protect Java application bytecodes at run-time in accordance with the present invention.

In FIG. 6, there is illustrated an overview of the run-time process to protect Java application bytecodes in accordance with the present invention in terms of the Java bytecode protection security module 404 shown in FIG. 4. As previously mentioned, the Java bytecode protection security module 404 is developed in the C programming language and itself protected by tamper resistance techniques, such as those provided by Cloakware Inc. of Ottawa, Ontario, Canada, so as to be robust and tamper resistant. It should be understood that the programming engines underlying the Java bytecode protection tool 402 and security module 404 may be engines developed in other programming languages. In fact, the security module 404 underlying this invention can be developed in other programming languages so long as such languages are capable of interfacing with the Java Virtual Machine.

Upon initiating run-time, the JVM 410 loads the protected Java application bytecode stub 408 as it would in loading any normal Java application. This triggers the Java application bytecode stub 408 to bootstrap trusted and protected Java application bytecode by interacting with the security module 404 via the JNI 602. During the run-time, the security module 404 serves to manage and control data flow so as to secure and protect the Java application bytecode and the execution thereby preventing dynamic attacks to the bytecode and the execution.

With further regard to FIG. 6, the major functional components and data files will now be described. Data and flow control to and from the security module 404 is via the Java application bytecode work space 604. The work space 604 is a virtual work space for the Java application within the JVM 410. At different states of run-time, which include loading and executing the application, the actual application bytecode residing in the JVM 410 is managed differently. Each state of the work space contains legitimate and fully-functional application bytecodes, but not complete application bytecodes. Optionally, certain portions of these bytecodes may always be kept in their protected forms depending on build time configuration settings—e.g., enabling transfer execution with Java and C execution options. When the portion of bytecodes is required to be executed, the security module 404 will load and restore them within the work space into the JVM 410 just-in-time and then remove them after the execution. Also, certain original method bytecodes have been translated into C functions which are not directly visible from the JVM 410 and can only be invoked by the security module 404. In this approach, an attacker is only able to see pieces of the original application bytecodes at any given moment during run-time which makes is extremely difficult to reverse engineer an entire application bytecode.

The security module 404 (SM) also includes a bridge mechanism referred to in FIG. 6 as the JNI SM bridge 418. The JNI SM bridge 418 is an interaction component that makes connection and co-function possible via the JNI 602 between the JVM 410 and the security module 404. Sub-components of the JNI SM bridge 418 include the JNI 602 to provide the sole mechanism of interactions between the JVM 410 and native code. Also included in the sub-components is a down-call stub 612 and up-call stub 608. These stubs provide the application programming interface to redirect down-calls from the Java application bytecode work space 604 of the JVM 410 to the dynamic security handlers 611 via the security module 404 in native programming code, and redirect up-calls from the security module 404 to the JVM 610. The third sub-component shown is the SM manager 610. The SM manager 610 is a controller and coordinator for the security module 404. It not only manages and maintains various designated protections to the Java application bytecode, but also to the security module 404 itself. It also contains utilities commonly used by other functional components of the security module 404.

The security module 404 also includes a plurality of dynamic security handlers 611. Each individual dynamic security handler 611 is invoked to perform a unique protection technique. As shown, the dynamic security handlers according to certain embodiments can include a WB dynamic security handler 614, a Bytecode Integrity Verification dynamic security handler 616, an anti-debugging dynamic security handler 618, an SLB dynamic security handler 620, a DBD dynamic security handler 622, a transfer execution dynamic security handler 624, a partial execution dynamic security handler 626 and a code transformation 628. The details of the dynamic security handlers 611 are described later herein below.

Coordinating with the build-time Java bytecode protection tool 402, the SM manager 610 and dynamic security handlers 611 are also designed such that they work together to provide a plug-in mechanism to add and extend security capability and new protection by easily integrating additional new dynamic security handler with the security module.

Figure 7:
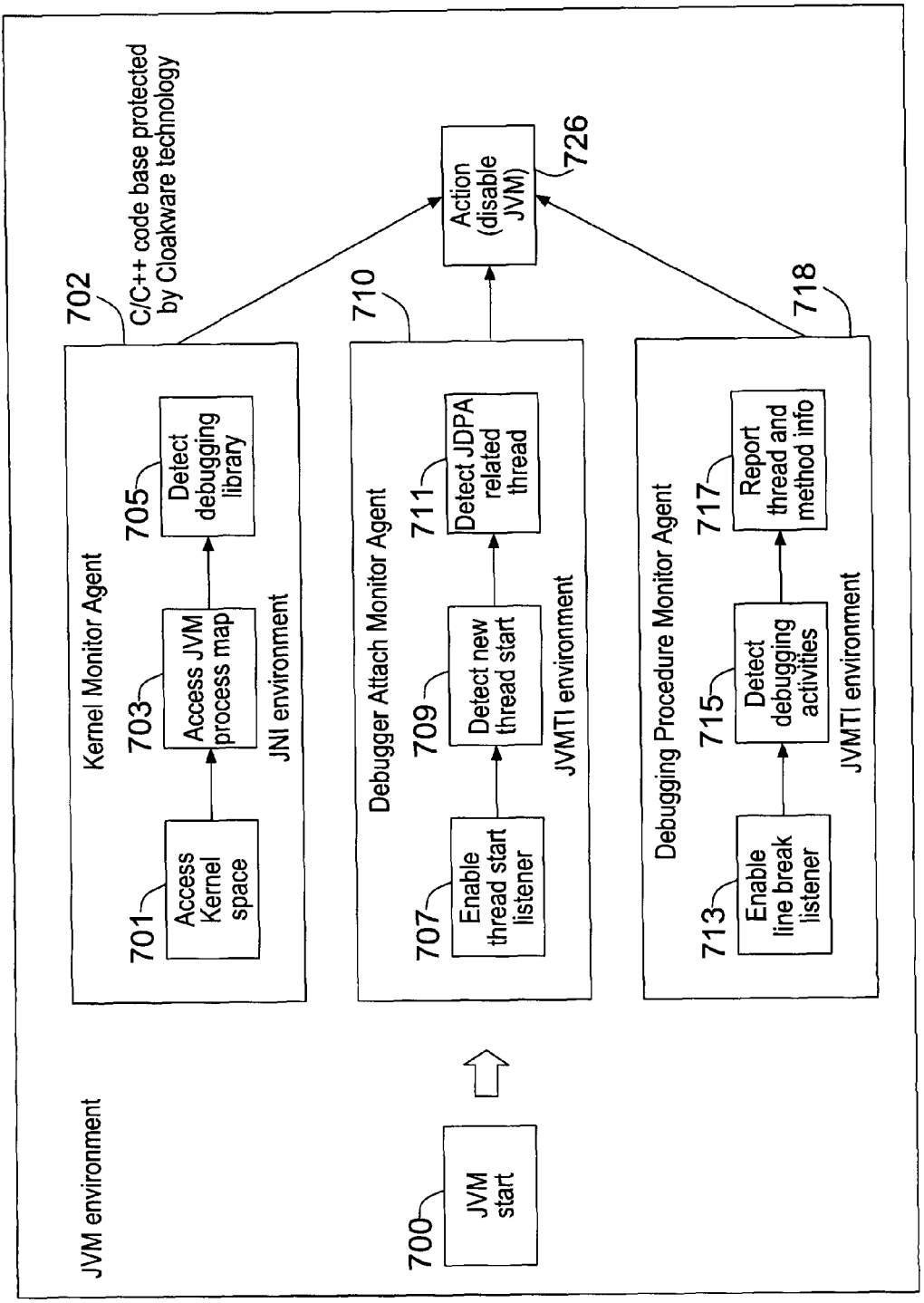
FIG. 7 is a diagram illustrating the anti-debug capability at start-up and run-time in accordance with the present invention.

In FIG. 7, one embodiment of the inventive method for external anti-debug monitoring is illustrated. Here, Java Platform Debug Architecture (JPDA) facilitates the capability of debugging the Java application. The inventive method focuses on detecting debug enabling and its subsequent debugging activities based on the JPDA. A multilayer defense strategy is used to maximize the chance of capturing the debugging activities both statically and dynamically within a running JVM process as shown. The three agents illustrated in the AD method shown in FIG. 7 can be configurable to allow normal or legal debugging activity to be performed. The three agents include a Kernel Monitor Agent (KMA) 702, a Debugger Attachment Monitor Agent (DAMA) 710, and a Debugging Procedure Monitor Agent (DPMA) 718.

In regard to the KMA 702 accessing kernel space 701, it is required that the JVM process load a debugging library 705 into its memory space before any debugging function can be performed. The KMA 702 is spawned when the Java application starts. The KMA 702 periodically checks its own process map 703 from the Kernel to determine if libraries related to JDPA are loaded into its memory space. The appropriate related action is taken should these libraries be found.

In regard to the DAMA 710, this agent serves the second line of defense. DAMA 710 is facilitated with Java Virtual Machine Tool Interface (JVMTI) capabilities and is loaded when JVM starts 700. A call back function is provided to constantly monitor thread-start screens for every thread created during the runtime. Activities of any attached JDPA debugger in the Java application can be captured whenever the JVM loads certain threads deemed to be essential to perform debugging. In this regard, AMA enables the thread start listener 707, detects a new thread start 709 and detects a JDPA related thread 711.

In regard to the DPMA 718, this agent is provided as a third line of defense. The DPMA 718 also operates under the JVMTI environment. A call back function monitoring the debugging procedure (e.g., hitting a break point line) will be triggered whenever such action is taken. Detailed messages such as the thread and its location of the breaking point can be collected. In this regard, the DMPA enables a line break listener 713, detects debugging activities 715 and report any thread and method information 717. Each of the KMA, DAMA and DPMA can trigger an action and disable JVM 726.

The aforementioned static and dynamic security handlers will now be described in further detail. The WB security handler includes an external WB cryptographic library as shown in FIG. 8 and an internal WB cryptographic facility as shown in FIG. 9.

Figure 8:
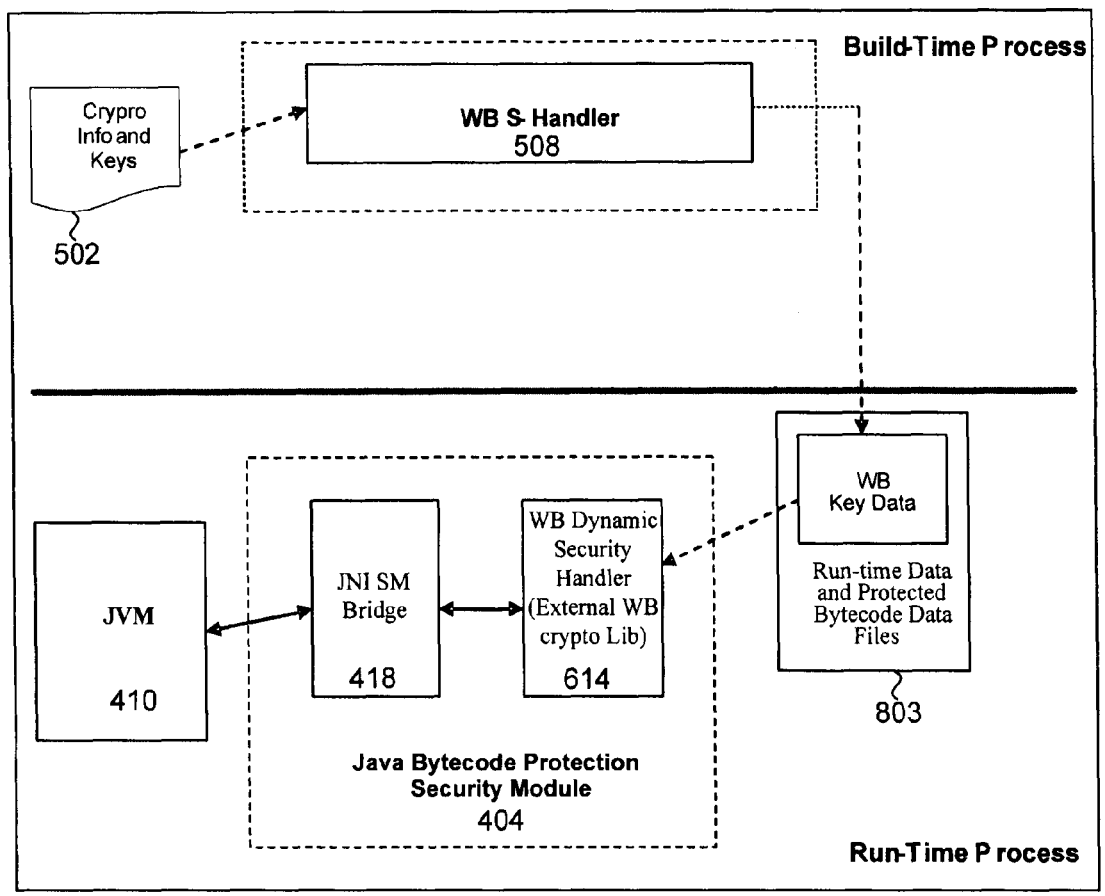
FIG. 8 is a diagram illustrating the external white box (WB) cryptographic library in accordance with the present invention.

The external WB cryptographic library in FIG. 8 provided by the WB dynamic security handler 614 provides a library that is used by the Java application for WB encryption and decryption functions via the JNI security module interface 804. The WB static handler 508 accepts cryptographic information and original keys 502 from a user, and generates WB key data 803 that can be distributed and rolled as needed, which the cryptographic library can then use for secure cryptographic operations.

Figure 9:
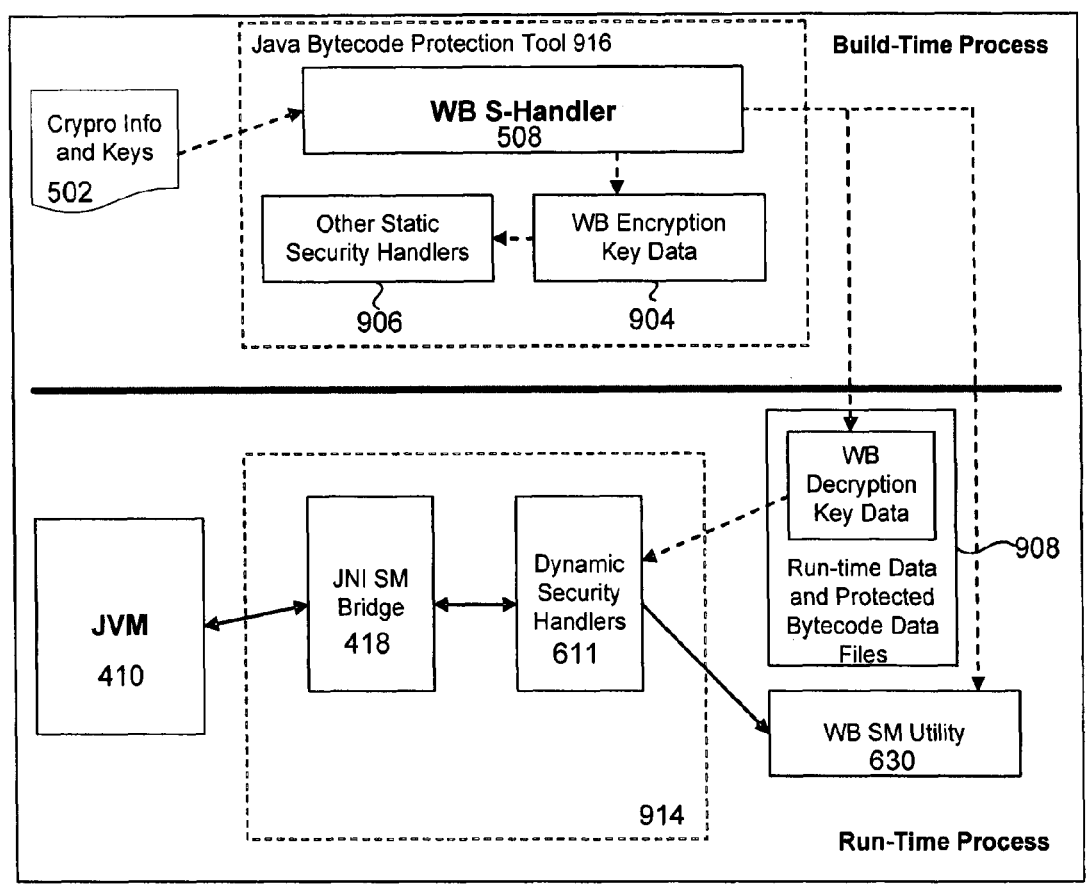
FIG. 9 is a diagram illustrating the internal WB cryptographic facility in accordance with the present invention.

The internal WB cryptographic facility contains a WB static handler 508 and a number of static and dynamic components are illustrated in FIG. 9. The WB static handler 508 accepts cryptographic information and original keys 502 from a user, and generates WB encryption key data 904, which other static security handlers 906 then use for encryption operations to different forms of application bytecodes as part of different protection techniques. The WB static handler 508 also generates WB decryption key data 908 and provides a WB security module utility 630 that are each used by dynamic security handlers 611 to perform decryption operations while the security module 914 performs dynamic protections.

Figure 10:
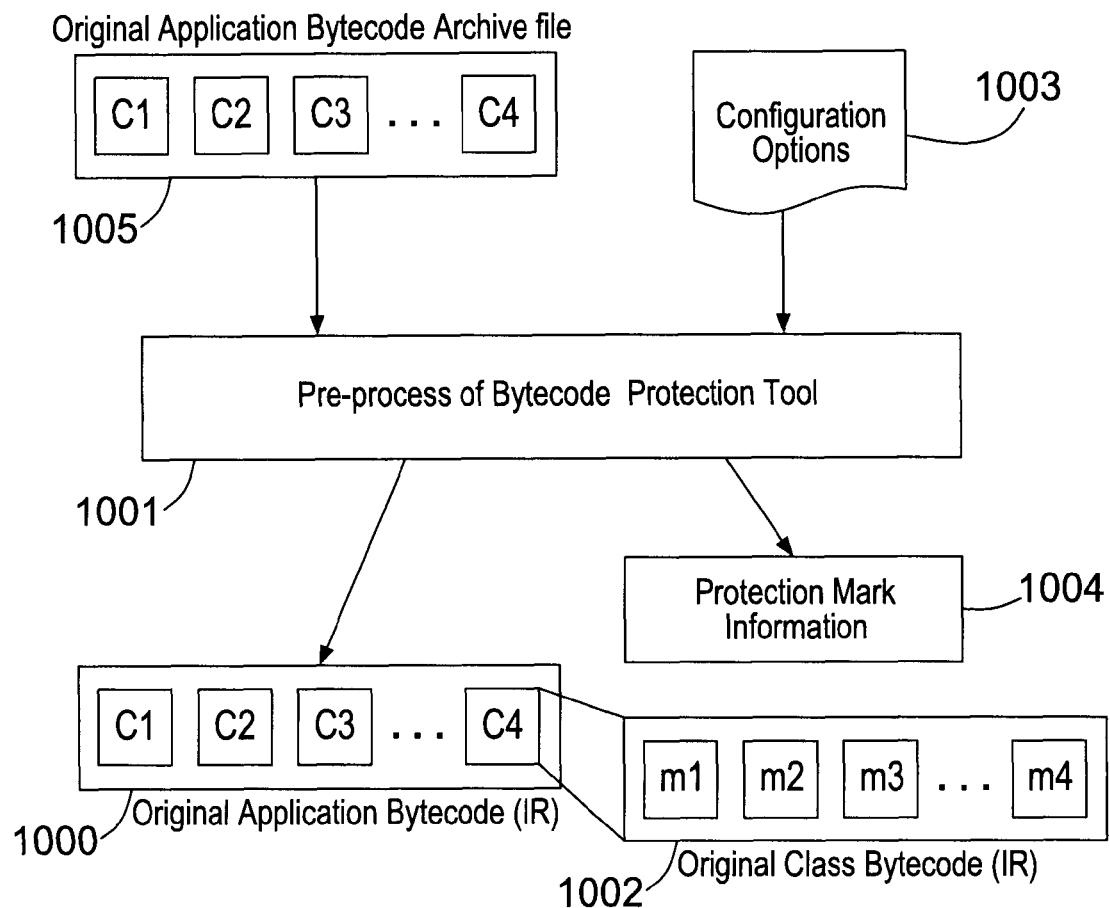
FIG. 10 is a diagram illustrating the pre-process of the bytecode protection tool in accordance with the present invention.

The Java bytecode protection tool 402 also includes a pre-processing method as shown in FIG. 10. This pre-process tool 1001 accepts the original Java application bytecode archive files 1005 and translates them into an Internal Representation (IR) of the original application bytecode. Particular classes and methods are then marked for protection and their manner of protection according to user options 1003. Protection mark information 1004 is thereby generated. Both the original application bytecode in IR form 1000 and protection mark information 1004 are used by each static security handlers 522 for desired protections.

Figure 11:
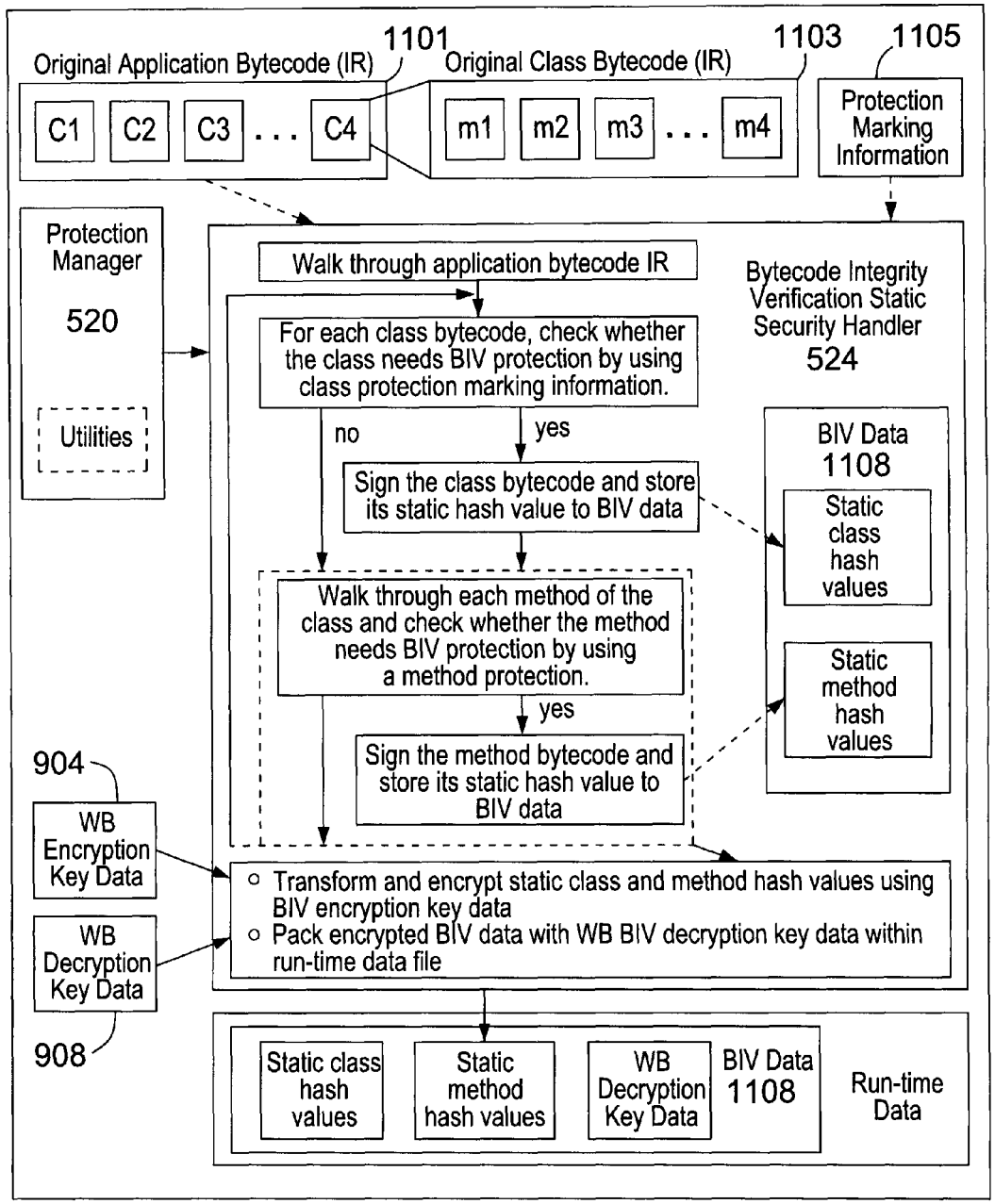
FIG. 11 is a diagram illustrating the work flow of the Bytecode Integrity Verification (BIV) static security handler in accordance with the present invention.
Figure 12:
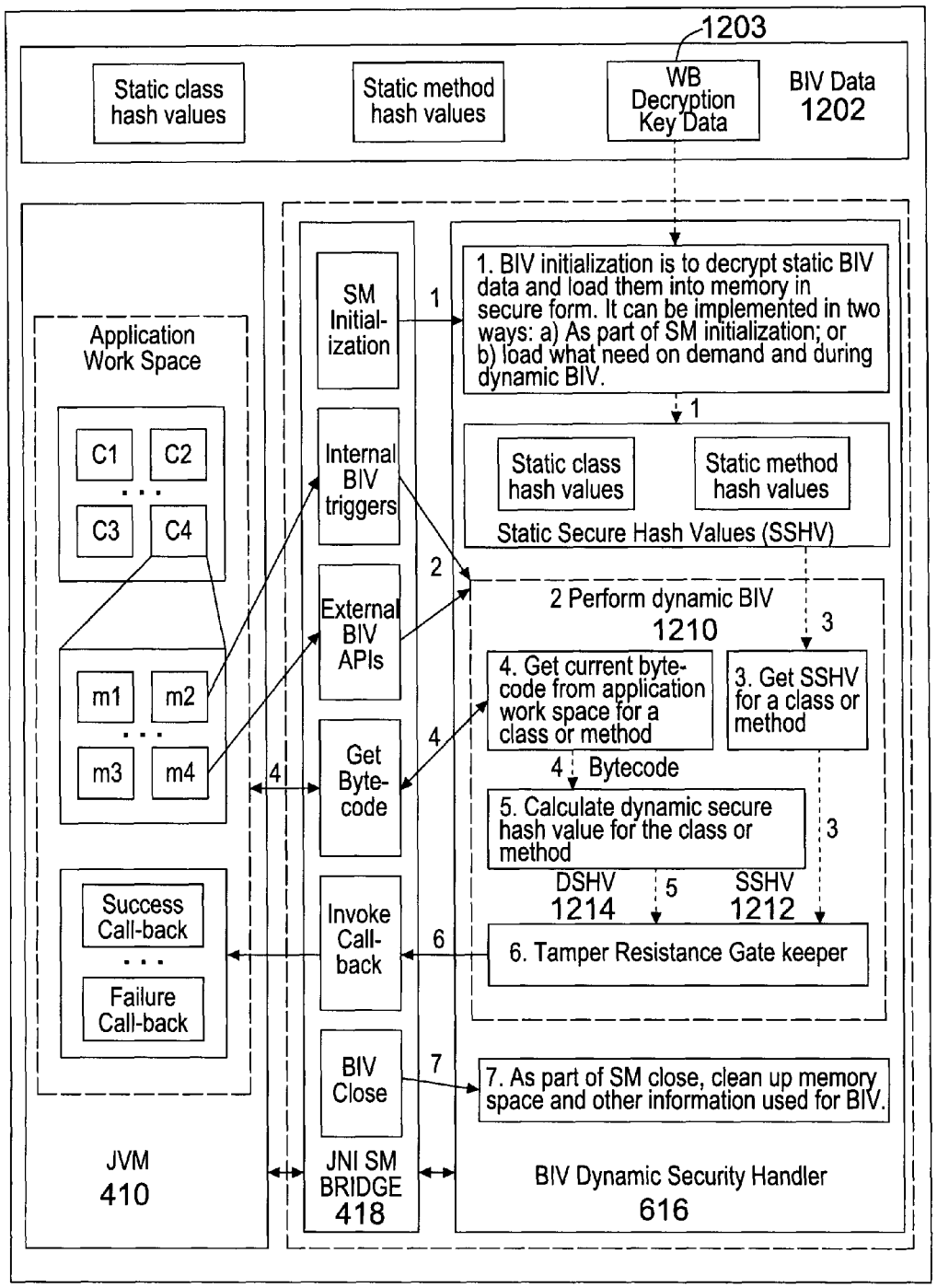
FIG. 12 is a diagram illustrating the work flow of the BIV dynamic security handler in accordance with the present invention.

Within each static security handler of the Java protection tool 402, there is provided Bytecode Integrity Verification (BIV). FIG. 11 illustrates the work flow of the BIV static security handler 524. As well, FIG. 12 illustrates the work flow of the BIV dynamic security handler 616. Here, BIV provides unique tamper resistance protection by introducing a dynamic integrity verification capability to Java bytecodes during run-time. In general, at build-time a tool is used to sign classes and methods that require BIV protection where the BIV data 1202 is generated and then protected and BIV actions build into the Java bytecode. At run-time, BIV actions are triggered via the Java bytecode protection security module 404 for BIV protected classes and methods, where dynamic secure hash values are just-in-time calculated for their respective bytecode. Both static and dynamic secure hash values are represented in a secure form and feed into the Tamper Resistance Gate Keeper (TRGK) 1216 with success and/or failure call-back functions. The TRGK 1216 determines whether a BIV check is successful or failed without explicitly comparing the static and dynamic secure hash values. This can be accomplished via an appropriate algorithm in the form of a specifically designed mathematic computation. If the static and dynamic secure hash values are the same, this generally indicates that the BIV check passes and a success call-back function can be invoked. Otherwise, if the static and dynamic secure hash values are not the same, this indicates that tampering of a particular class or method is detected and the BIV check is failed. Thus, a failure call-back function can be invoked. Those call-back functions are user-defined countermeasures to detected tampering attacks.

In the present invention, the process of computing dynamic secure hash values 1214 of Java bytecode differs from typical processing of computations on normal native binary code in which the computation merely needs to pick native code directly from the memory allocated for the executable. Normally, application code cannot get a code segment directly from the memory at Java run-time. Instead, application code obtains a class or method bytecode through the JVM 410 mechanism. In this invention, the security module leverages this ability and the JNI interface by using an up-call to the JVM 410 to retrieve bytecodes and then computing the secure dynamic hash values 1214 and performing an integrity verification check of the retrieved bytecode against the pre-registered hash value.

With regard to FIG. 11, the bytecode integrity verification static security handler 524 is seen to include bytecode signing. One of the major functions of the BIV static security handler 524 is to walk through application bytecodes and check each of the classes and methods using protection mark information 1105 to determine which class or method needs the BIV protection. If a class or method requires the BIV protection, a specific hash value is computed by applying a secure hash calculation to the particular class or method bytecode 1106, 1107. In general, a secure hash calculation algorithm as known in the computing art is commonly used. These resultant hash values are stored as BIV data 1108 in an organized and structured way so that they can be used effectively during run-time.

The BIV data 1108 of the bytecode integrity verification static security handler is a data container that contains data of class and method static hash values and other information such as WB BIV decryption key data. Such data is used at run-time by the dynamic BIV security handler. In order to be used more effectively, BIV data 1108 is structured with corresponding information on each of the classes and methods to be protected and their static hash values.

The bytecode integrity verification static security handler 524 also serves to transform and encrypt BIV data 1108. The integrity of the BIV data 1108 is very important to maintain. BIV data can be transferred or download via networks. Accordingly, the present invention applies transformation and encryption to them as part of packing them for use. Without such protection, any tampering of the BIV data can be a step to break BIV protection. During packaging time, the BIV static security handler performs double protections to the BIV data so as to prevent static attacks to sensitive BIV data. First, the BIV static security handler 524 performs the data transformation to the static hash values so that these values can be operated in transformed form at run-time by the dynamic BIV security handler 616. This serves to ensure that the real plain values are never exposed. Secondly, the BIV static security handler 524 then performs encryption of these transformed values so as to prevent any tampering occurring to these transformed values before being dynamically used.

It should be understood that the BIV data 1108 is one kind of run-time data that are used at run-time by the dynamic security handlers 611. Run-time data can be organized and stored into a single file or multiple files according to user options. There are some advantages to the form of multiple run-time data files, such as that the data information can be updated and downloaded in a more fine grain. For example, BIV data 1108 can be structured for each of the Java classes to be protected. In this manner, BIV protection can be performed more feasibly on each class base.

The bytecode integrity verification static security handler 524 also provides unique BIV triggering. Two approaches to trigger BIV at run-time are provided via an external BIV API and an internal BIV trigger. As a first approach that is part of the designated system under this invention, a set of external BIV APIs are provided for users to use them in proper places within their Java code where a user has a clear idea to perform a BIV check. The user can indicate which Java class or method needs a BIV check. The user will have full control of mitigating actions by using call-back functions. The other approach is an alternative to triggering by a user invoking external APIs. Instead, BIV triggers can be pre-built within certain functions of the Java bytecode protection security module. Each time the Java application invokes those functions, the internal BIV actions can be triggered in a pre-arranged fashion. Certain mitigating actions are pre-defined and taken by the security module internally. However, a user will still have partial control on the mitigating actions. This is enabled by providing a pre-setting API for a user to pre-set mitigating actions taken by the security module so that it will act accordingly to the setting. In general, users have full control on whether and where to use the external BIV API, and have indirect control on whether to use the internal BIV triggers at build-time. Users do not have any control where to trigger the internal BIV as that is hidden and controlled by the security module.

With regard to FIG. 12, the bytecode integrity verification dynamic security handler 616 is seen to include BIV initialization. BIV initialization is provided to load secure static BIV data 1202 and decrypt them using the WB BIV decryption key data 1203, and thereafter load them into the memory in secure form. BIV initialization can be implemented in two ways: as part of security module initialization or on demand during dynamic BIV. In regard to the first way, this can be done once as part of SM initialization when loading the protected Java application. In regard to the second way, this can be accomplished by loading what is needed on demand during dynamic BIV. This can be done when the BIV is required for a class. BIV data files can be organized at the class level. For a particular class, BIV data is loaded and decrypted for this class only. This second approach can provide more flexibility to users to leverage small changes required to BIV data if the class bytecode changes.

The bytecode integrity verification dynamic security handler also performs dynamic BIV 1210. As discussed above, the dynamic BIV of a class or method can be launched by either external BIV API calls or other functional calls from the protected Java application to the security module that contains a pre-arranged internal BIV trigger. Performing dynamic BIV includes at least the following key actions: getting the latest bytecode, computing the dynamic secure hash value, and providing a tamper resistance gate keeper (TRGK) 1216.

Getting the latest Bytecode occurs via an up-call. In order to calculate the secure dynamic hash value securely for a class or method within the security module, the latest bytecode of a class or method has to be obtained via an up-call to the JVM 410 via the JNI. The same bytecode itself should be interpreted or compiled into binary while executing this class or method loaded to the JVM 410. If there are not any tampering attacks to the bytecode, the bytecode should be the same bytecode to which the static secure hash value has been calculated.

The action of dynamic secure hash value computation involves classic known hashing computation, but the resultant value is in protected form and will be used in protected form.

Providing the TRGK 1216 involves two inputs. The TRGK 1216 uses both static and dynamic secure hash values (SSHV 1212, DSHV 1214) for a particular class or method to verify whether the integrity of the bytecode of the class or method is compromised. If any tampering happens to the bytecode, its DSHV 1214 cannot be the same as its SSHV 1212. The TRGK 1216 can detect any tampering to the bytecode. If the BIV verification passes, TRGK 1216 will trigger a success call-back function or to return to the original BIV trigger; otherwise, the TRGK 1216 will trigger a failure call-back function as the user's mitigating action.

The bytecode integrity verification dynamic security handler 616 also includes a termination step in the form of the BIV close. The BIV close as part of the security module performs cleaning up of the memory space and the other information used by BIV dynamic secure handler.

Figure 13:
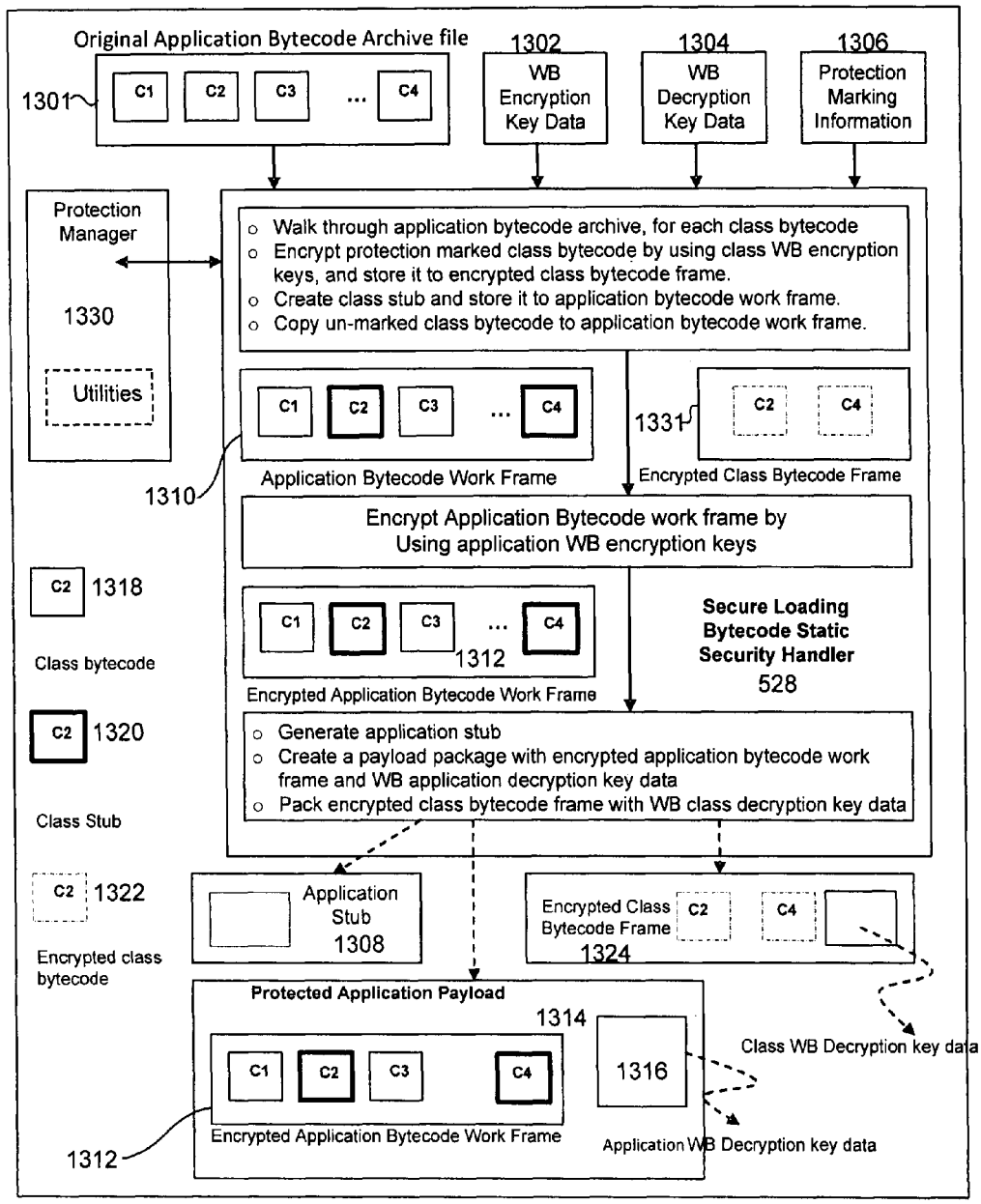
FIG. 13 is a diagram illustrating the work flow of the Secure Loading Bytecode (SLB) static security handler in accordance with the present invention.

With regard to FIG. 13, the Secure Loading Bytecode (SLB) static security handler 528 is shown. The SLB static security handler 528 receives the internal representation of the original Java application bytecode 1301 along with the WB encryption 1302 and decryption key data 1304 and the protection marking information 1306.

An important output of the SLB static security handler 528 is the application stub 1308. The application stub 1308 contains a bootstrapping class to launch a loading process via the security module during run-time. The application stub 1308 is loaded by the JVM 410. The application stub 1308 contains each external public API necessary to enable the application to be launched independently or via another Java application. The application stub 1308 contains methods that invoke down-call functions to the security module, which in turn will decrypt and load the Java application into the JVM for execution.

To prepare the application stub, the SLB static security handler 528 includes an application bytecode work frame 1310 and an encrypted application bytecode work frame 1312. The application bytecode work frame 1310 is different from the original application bytecode 1301. In general, a class within the application bytecode work frame 1310 does not require protecting so it will be the same as the original one. If a class needs to load securely, a class stub replaces the original class bytecode and thus the class bytecode is the original bytecode. The encrypted frame 1312 is obtained by encrypting the application bytecode work frame 1310 using the application WB encryption key data 1302 via the static security handler 528 during build-time, and is decrypted using application WB decryption key data 1304 via the dynamic security handler 620 during run-time.

In addition to the application stub 1308, the application payload 1314 is generated. The application payload 1314 contains the encrypted application work frame 1312 and the application WB decryption key data 1316. The application WB decryption key data 1316 in the protected application payload is the key data generated by the WB static security handler 508 and passed to the SLB static security handler 528 as part of the WB decryption key data 1302. At run-time, it is used to decrypt the encrypted application bytecode work frame 1312.

As shown in FIG. 13, the underlying code may be formed as class bytecode 1318, class stubs 1320, or encrypted class bytecode 1322. Class bytecode 1318 is original bytecode. The class stub 1320 contains a bootstrapping method to launch a trusted class loading process via the security module during run-time to load the encrypted class bytecode 1322 when necessary. During the packaging time, the class bytecode 1318 is analyzed. Marked methods are replaced by methods that invoke down-call methods to the security module, where the security module invokes the original bytecode functionality via a security handler method designated at packaging time. The encrypted class bytecode 1322 is obtained by encrypting class bytecode 1318 using the class WB encryption key data 1302 via the static security handler 528 during build-time, and is decrypted using the class WB decryption key data via the dynamic security handler 620 during run-time.

An encrypted class bytecode frame 1324 is also generated by the SLB static security handler 528. It contains encrypted class bytecode and class WB decryption keys for one or more classes. Users have the option to control how many classes a frame can contain within their encrypted class bytecode 1322. The user has the option to load them together or separately during run-time. Class WB decryption key data is generated by the WB static security handler 508 and passes to the SLB static security handler 528 as part of the WB decryption key data 1304. At run-time, the class WB decryption key data 1304 is used to decrypt the encrypted class bytecode 1322. The user has the option whether generate one or multiple class WB encryption and decryption keys.

Figure 14:
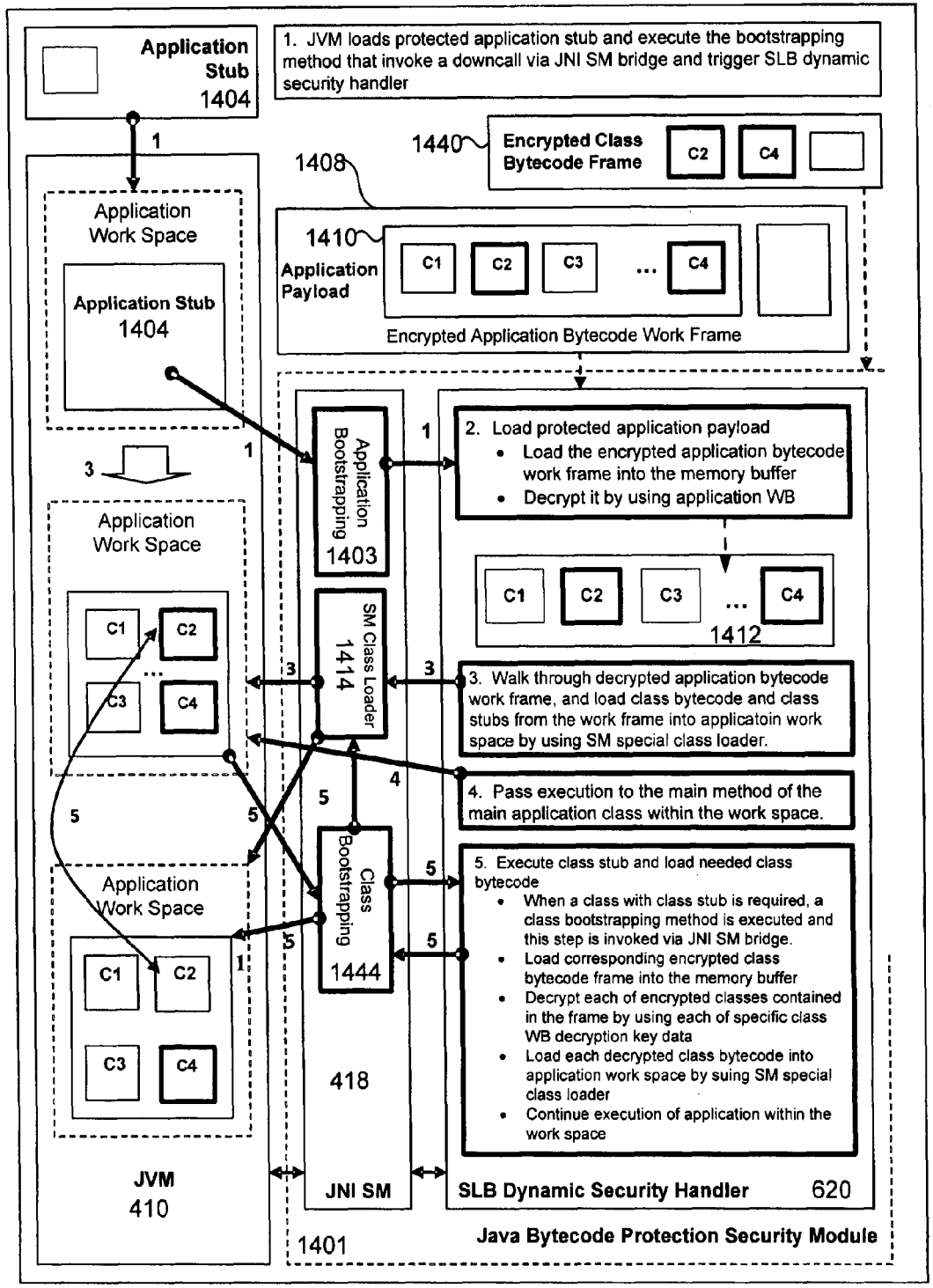
FIG. 14 is a diagram illustrating the work flow of the SLB dynamic security handler in accordance with the present invention.

In regard to FIG. 14, the work flow of an SLB dynamic security handler 620 is shown. The SLB dynamic security handler 620 is a functional component of the security module that is connected with the JVM 410 via JNI during bytecode execution. The SLB dynamic security handler 620 manages and controls loading of a protected Java application bytecode into the work space in the JVM 410. Advantageously, this capability can ensure that an original Java application bytecode is protected and likewise distributed in a protected form so as to prevent any static attacks to the application bytecode occurring before loading the application bytecode to the JVM 410. The SLB D-handler 620 contains two main functional components including secure application loading and secure class loading.

Secure application loading involves the protected application stub 1404 which is located in the class path and loaded normally by a JVM 410. A main bootstrapping method is executed after the loading, and then an application bootstrapping method 1403 is invoked through a down-call API via the JNI SM bridge 418. This triggers the following application loading actions of the SLB dynamic security handler 620. First, the protected application payload 1408 is loaded from the protection data folder. This includes loading the encrypted application bytecode work frame 1410 from the payload 1408 into memory buffer, and then decrypting the encrypted application bytecode work frame 1410 just-in-memory by using the application WB decryption key data 1304. Next, the decrypted application bytecode work frame 1412 is walked through to load each class bytecode and class stubs from the work frame into the application work space by using a special SM class loader 1414. The SM class loader 1414 utilizes the security module to load encrypted bytecode, and decrypt and load the bytecode into the JVM 410. Additional security checks may be incorporated to add BIV protection to the SM class loader 1414 and also checks on class loader hierarchy and integrity during load and run time. Finally, execution is passed to the main method of the main application class within the work space.

Figure 15:
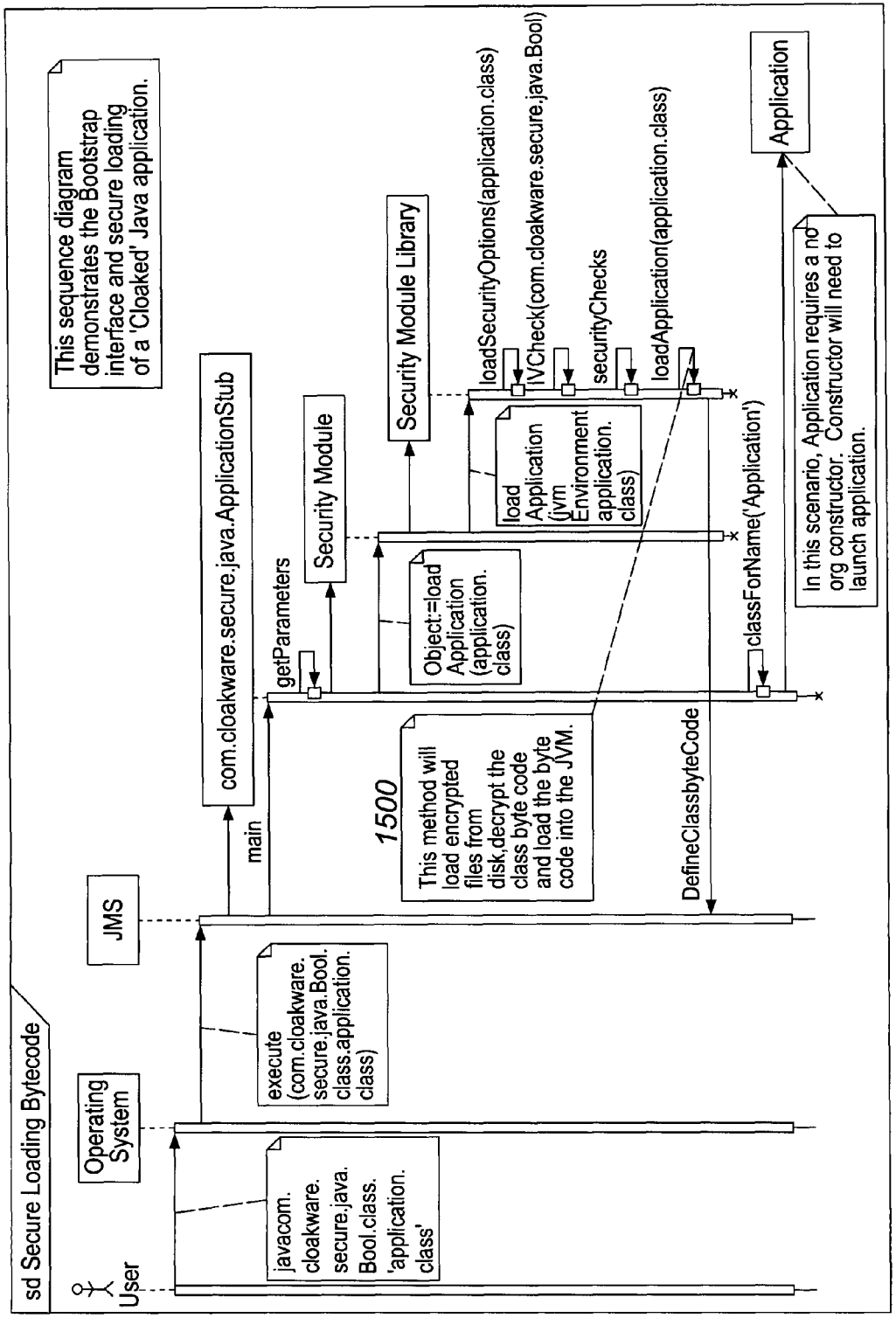
FIG. 15 is a diagram illustrating the bootstrap interface and secure loading of a cloaked java application in accordance with the present invention.

Secure class loading involves the triggering of a class bootstrapping method as illustrated in FIG. 15. In general, an encrypted class bytecode frame can be pre-installed or downloaded on the device before executing the protected application, or downloaded on the device during its execution. This depends on the functional nature of the application. When classes with class stubs are required during the execution of the protected application, a class bootstrapping method is triggered and the following steps 1500 are executed via the JNI SM bridge to load the required class from the encrypted class bytecode frame. First, the corresponding encrypted class bytecode frame is loaded into the memory buffer. Next, each of the encrypted classes contained in the frame just-in-memory is decrypted by using each of the specific class WB decryption key data. The decrypted class bytecode is then loaded into the application work space by using the SM class loader. Thereafter, execution of the application continues the within the work space It should be noted that, unlike running a native application where all code must be loaded first, the JVM allows for loading a new class on the fly. This extends applications dynamically by loading classes only when they are needed. Moreover, this characteristic of Java provides a good opportunity to use the SLB secure class loading against code lifting attacks. Further, after a protected class is SLB securely loaded and executed, the present invention can provide options to maintain the class in a protection state by restoring back to its class stub. In such a way, only at just-execution time is the original bytecode of the class available within the JVM image, while it remains within protected form for other times.

In general, Dynamic Bytecode Decryption (DBD), involves decryption of protected method bytecodes only when the encrypted method is invoked by a running Java program. This ensures that all of an application's unencrypted bytecode is never resident in memory at one time.

Figure 16:
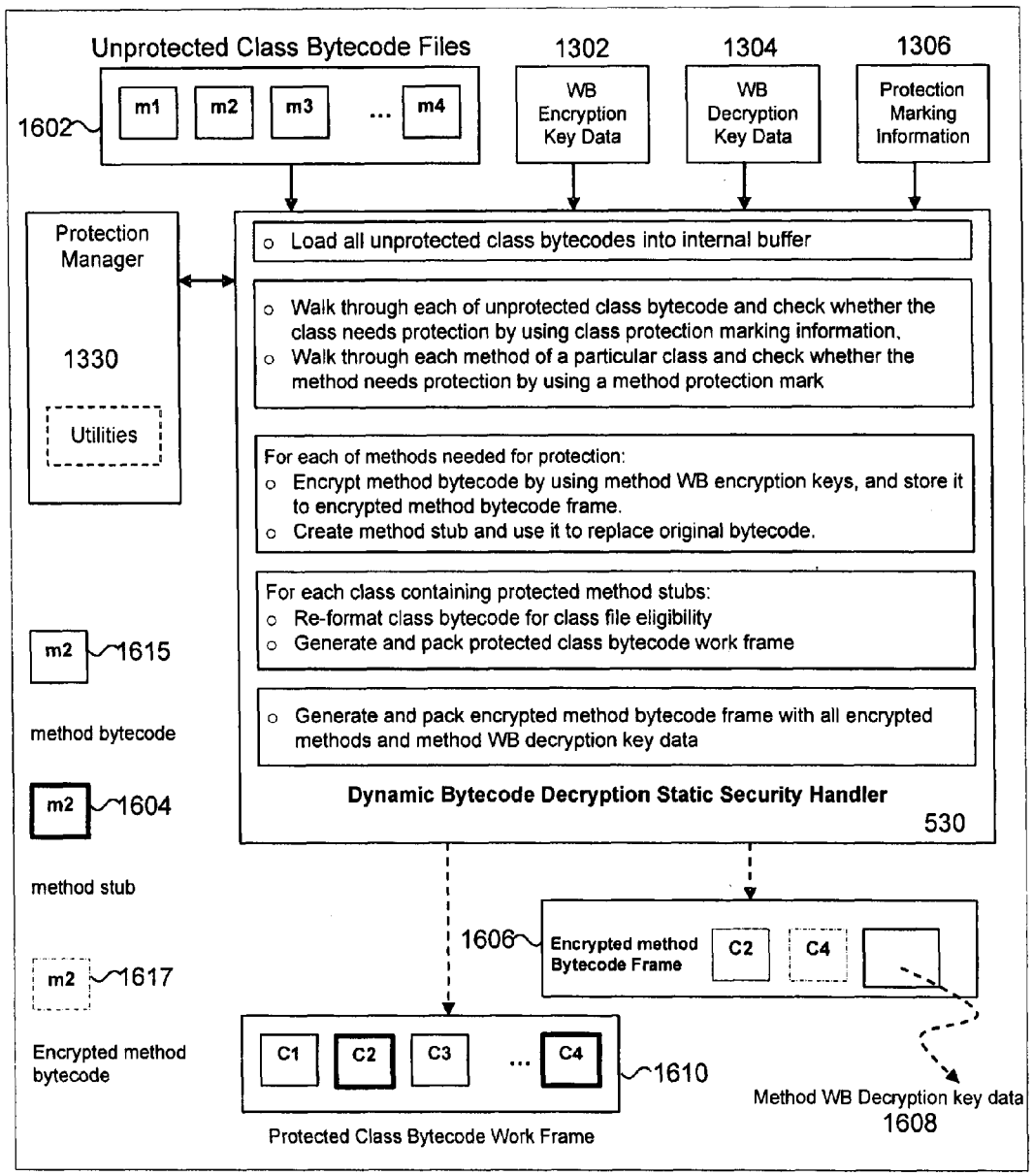
FIG. 16 is a diagram illustrating the work flow of the Dynamic Bytecode Decryption (DBD) static security handler in accordance with the present invention.

In regard to FIG. 16, the build time workflow of a DBD static security handler 530 is shown. During build time, each unprotected class bytecode file 1602 is loaded into an internal buffer and a new class bytecode work frame is constructed for a class to be protected by DBD using the protection marking information 1306, where marked methods are replaced with a method stub 1604 that will invoke down call methods to trigger the invocation of DBD dynamic security handler 530 at run-time. For each Java method to be protected, its bytecode is encrypted by using method WB encryption keys and storing the encrypted method into the encrypted method bytecode frame 1606 that is packaged along with the WB decryption key data 1608 for distribution as part of protected bytecode data. The original bytecode class is replaced by the protected class bytecode work frame 1610 for distribution.

Figure 17:
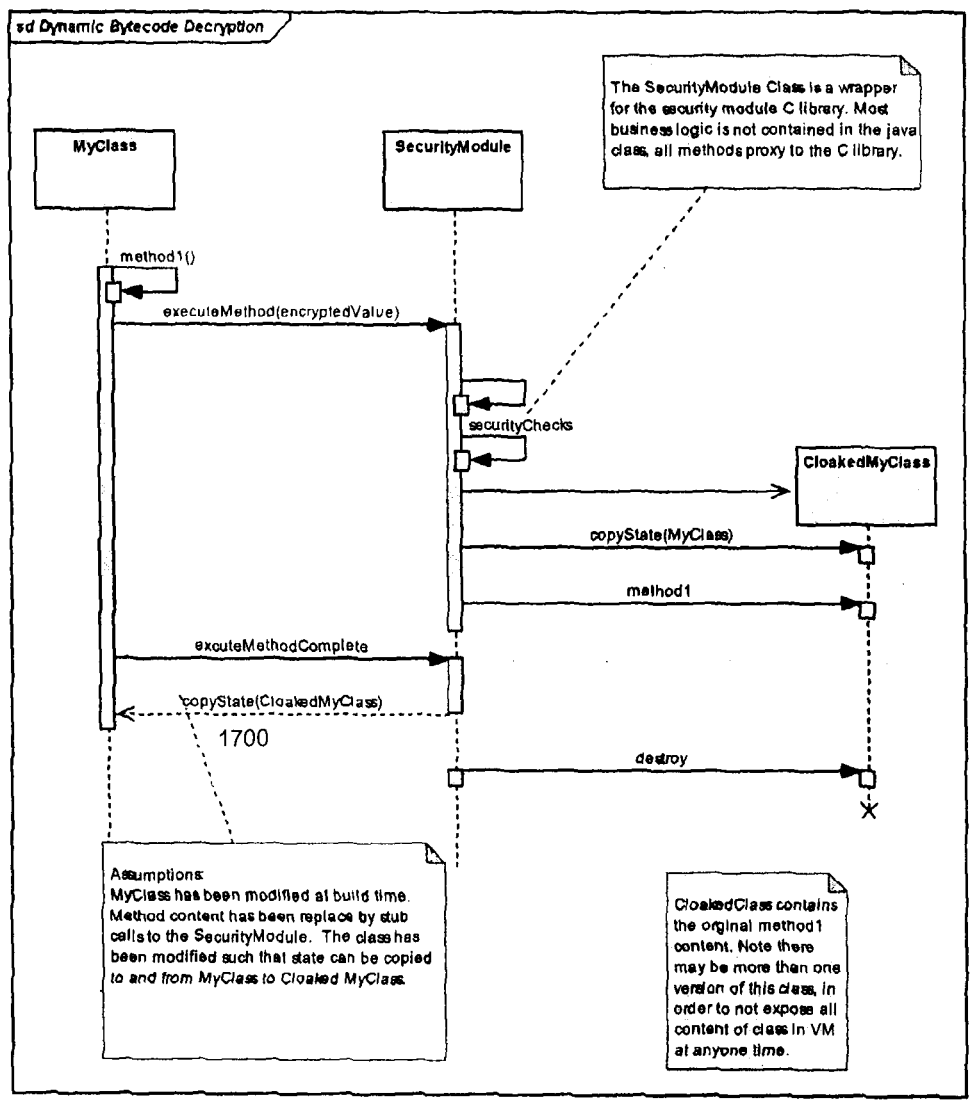
FIG. 17 is a diagram illustrating a DBD sequence diagram in accordance with the present invention.
Figure 18:
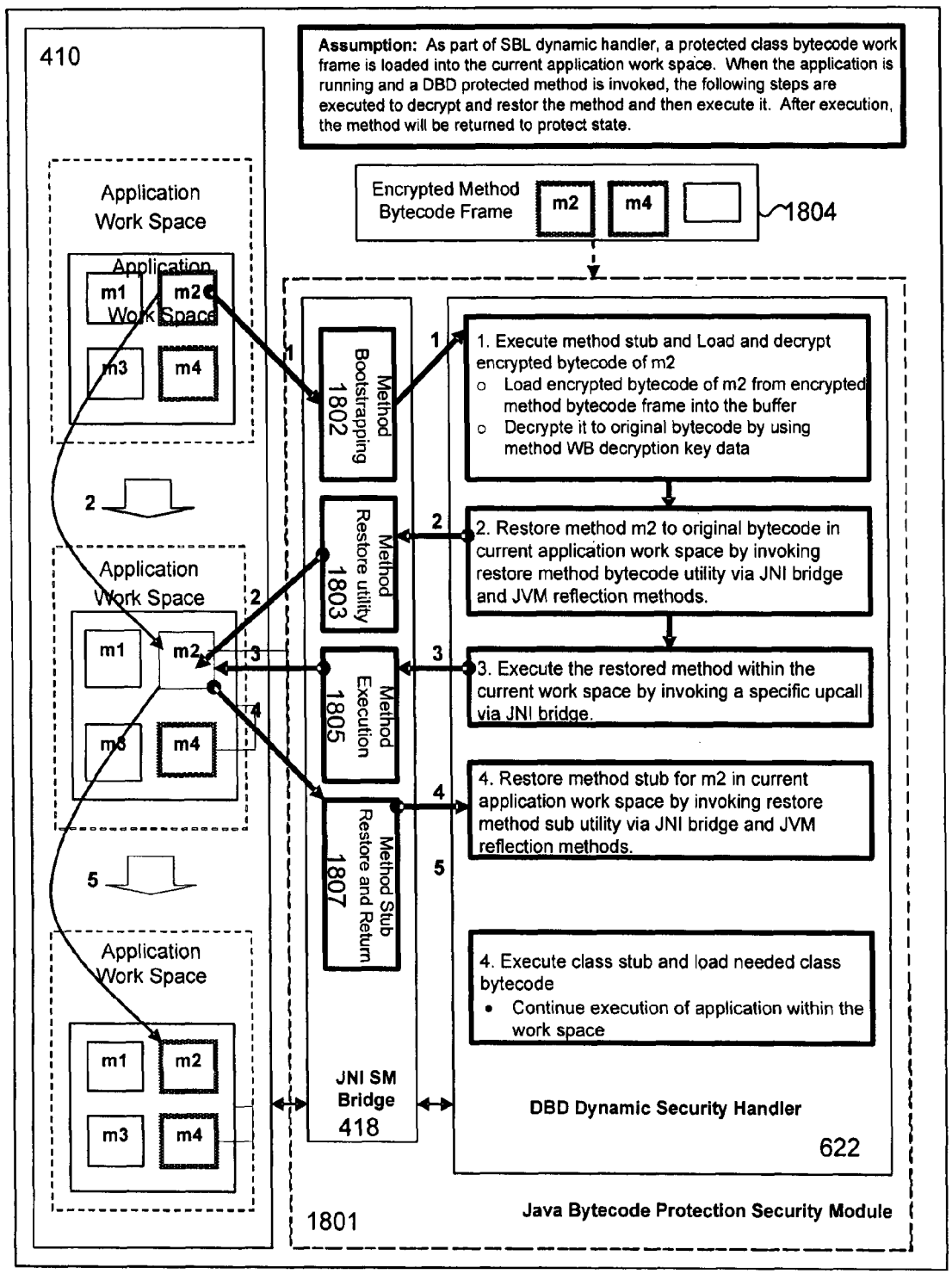
FIG. 18 is a diagram illustrating the work flow of the DBD dynamic security handler in accordance with the present invention.

FIG. 18 shows an execution time workflow of the DBD dynamic security handler 622. When an encrypted DBD Java method is invoked while executing a protected Java application on the JVM, the method stub is first executed and then a down call, method bootstrapping 1802, is invoked within the DBD dynamic security handler 622. It identifies and decrypts the encrypted method from the encrypted method bytecode frame 1804 by using WB method decryption key data and restores its real bytecode to the JVM. An implementation for restoring class bytecode to the JVM can involve restoring a copy of the class to the JVM, with the class renamed to avoid naming conflicts within the JVM namespace. An example of this is shown in FIG. 17 where the partially decrypted class is loaded into the JVM with a new class name.

In FIG. 18, if needed, once the original bytecode is restored to the JVM, the DBD dynamic security handler 622 may copy the class state to the real bytecode instance, this option is determined at build time. The DBD dynamic security handler 622 then invokes the unencrypted method in the JVM 410. Once the method invocation is complete the security handler 622 then restores the real state from the unencrypted class instance to the encrypted instance and the control is returned to the originating down call method. FIG. 17 shows the sample method invocation and state copy operations 1700 prior to calling the unencrypted method. Once the unencrypted method has completed execution, the state is copied back to the class instance with the protected method stubs by the DBD dynamic security handler 622. The control is returned to the protected method, whilst the security handler removes the unencrypted class and instance from the JVM 410.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. An apparatus for increasing tamper-resistance of Java bytecode, comprising:
   one or more processors; and
   one or more memories operatively coupled to at least one of the one or more processors and having instructions stored thereon that, when executed by at least one of the one or more processors, cause at least one of the one or more processors to:
      apply protections to Java bytecode during build-time to generate secured Java bytecode and corresponding security information;
      load at least a portion of the secured Java bytecode into a Java Virtual Machine (JVM) executing within an unprotected hardware environment;
      load the corresponding security information into a software-implemented security module, wherein the software-implemented security module is configured to execute in the same unprotected hardware environment as the JVM during deployment time and to communicate with the JVM via a Java Native Interface (JNI) bridge during loading and execution of the secured Java bytecode; and
      counter static and dynamic attacks to the secured Java bytecode during loading and execution of the secured Java bytecode via one or more software-implemented protection mechanisms, wherein at least one of the one or more software-implemented protection mechanisms are integrated into the software-implemented security module, wherein the static and dynamic attacks are countered based at least in part on the corresponding security information loaded into the software-implemented security module, and wherein the software-implemented security module is configured to co-execute with the secured Java bytecode within the unprotected hardware environment via the JNI bridge during runtime.

2. The apparatus of claim 1 wherein the secured Java bytecode includes a protected Java application bytecode stub, a protected application payload, and an encrypted class bytecode frame.

3. The apparatus of claim 2 wherein the software-implemented security module is a functional extension to a JVM environment, is configured to provide a root of trustiness of protected Java applications, and is configured to interface with multiple different secured Java bytecodes.

4. The apparatus of claim 3 wherein the protected application payload is launched via the protected Java application bytecode stub.

5. The apparatus of claim 3 wherein the software-implemented security module includes a protected bytecode class loader and wherein the protected application payload is launched via the encrypted class bytecode frame using the protected bytecode class loader.

6. The apparatus of claim 1 wherein only a portion of the secured Java bytecode is stored in decrypted form at any time during execution of the secured Java bytecode.

7. The apparatus of claim 1 wherein the one or more software-implemented protection mechanisms are selectable according to configuration options.

8. The apparatus of claim 7 wherein the one or more software-implemented protection mechanisms include static security handlers and dynamic security handlers.

9. The apparatus of claim 8 wherein the static security handlers include a whitebox (WB) static security handler for accepting cryptographic information including cryptographic keys from a user to generate WB encryption key data used by one or more of other static security handlers,
   and WB decryption key data and a WB security module utility, each used by one or more of the dynamic security handlers during dynamic run-time protection of the software-implemented security module.

10. The apparatus as claimed in claim 9 wherein the static security handlers include a bytecode integrity verification (BIV) static security handler for applying hash code protection to the secured Java bytecode in response to protection marking information, and the dynamic security handlers include a BIV dynamic security handler for verifying the hash code protection at run-time, wherein the software-implemented security module invokes tampering countermeasures upon verification failure.

11. The apparatus as claimed in claim 9 wherein the static security handlers includes a secure loading bytecode (SLB) static security handler for forming during build-time a protected Java application bytecode stub, a protected application payload, and an encrypted class bytecode frame, and the dynamic security handlers includes an SLB dynamic security handler for loading into a memory buffer the encrypted class bytecode frame corresponding to the secured Java application bytecode, decrypting each of encrypted class contained within the encrypted class bytecode frame via the WB decryption key data corresponding to the encrypted class, loading each decrypted class bytecode into an application work space via a security module class loader so as to execute the Java application bytecode within the application work space.

12. The apparatus of claim 1, wherein the JNI bridge includes a down-call stub configured to redirect down-calls from a Java application bytecode work space of the JVM to the software-implemented security module and an up-call stub configured to redirect up-calls from the security module to the JVM.

13. The apparatus of claim 1, wherein software code corresponding to the software-implemented security module is protected by one or more tamper resistance techniques.

14. At least one non-transitory computer-readable medium storing computer-readable instructions that, when executed by one or more computing devices, cause at least one of the one or more computing devices to:
- apply protections to Java bytecode during build-time to generate secured Java bytecode and corresponding security information;
- load at least a portion of the secured Java bytecode into a Java Virtual Machine (JVM) executing within an unprotected hardware environment;
- load the corresponding security information into software-implemented security module, wherein the software-implemented security module is configured to execute in the same unprotected hardware environment as the JVM during deployment time and to communicate with the JVM via a Java Native Interface (JNI) bridge during loading and execution of the secured Java bytecode; and
- counter static and dynamic attacks to the secured Java bytecode during loading and execution of the secured Java bytecode via one or more software-implemented protection mechanisms, wherein at least one of the one or more software-implemented protection mechanisms are integrated into the software-implemented security module, wherein the static and dynamic attacks are countered based at least in part on the corresponding security information loaded into the software-implemented security module, and wherein the software-implemented security module is configured to co-execute with the secured Java bytecode within the unprotected hardware environment via the JNI bridge during runtime.

15. The at least one non-transitory computer-readable medium of claim 14, wherein the secured Java bytecode includes a protected Java application bytecode stub, a protected application payload, and an encrypted class bytecode frame.

16. The at least one non-transitory computer-readable medium of claim 14, wherein only a portion of the secured Java bytecode is stored in decrypted form at any time during execution of the secured Java bytecode.

17. The at least one non-transitory computer-readable medium of claim 14, wherein the one or more software-implemented protection mechanisms include static security handlers and dynamic security handlers.

18. The at least one non-transitory computer-readable medium of claim 14, wherein the JNI bridge includes a down-call stub configured to redirect down-calls from a Java application bytecode work space of the JVM to the security module and an up-call stub configured to redirect up-calls from the software-implemented security module to the JVM.

19. The at least one non-transitory computer-readable medium of claim 13, wherein software code corresponding to the software-implemented security module is protected by one or more tamper resistance techniques.

20. A method executed by one or more computing devices for increasing tamper-resistance of Java bytecode, the method comprising:
- applying, by at least one of the one or more computing devices, protections to Java bytecode during build-time to generate secured Java bytecode and corresponding security information;
- loading, by at least one of the one or more computing devices, at least a portion of the secured Java bytecode into a Java Virtual Machine (JVM) executing within an unprotected hardware environment;
- loading, by at least one of the one or more computing devices, the corresponding security information into software-implemented security module, wherein the software-implemented security module is configured to execute in the same unprotected hardware environment as the JVM during deployment time and to communicate with the JVM via a Java Native Interface (JNI) bridge during loading and execution of the secured Java bytecode; and
- countering, by at least one of the one or more computing devices, static and dynamic attacks to the secured Java bytecode during loading and execution of the secured Java bytecode via one or more software-implemented protection mechanisms, wherein at least one of the one or more software-implemented protection mechanisms are integrated into the software-implemented security module, wherein the static and dynamic attacks are countered based at least in part on the corresponding security information loaded into the software-implemented security module, and wherein the software-implemented security module is configured to co-execute with the secured Java bytecode within the unprotected hardware environment via the JNI bridge during runtime.

21. The method of claim 20, wherein the secured Java bytecode includes a protected Java application bytecode stub, a protected application payload, and an encrypted class bytecode frame.

22. The method of claim 20, wherein only a portion of the secured Java bytecode is stored in decrypted form at any time during execution of the secured Java bytecode.

23. The method of claim 20, wherein the one or more software-implemented protection mechanisms include static security handlers and dynamic security handlers.

24. The method of claim 20, wherein the JNI bridge includes a down-call stub configured to redirect down-calls from a Java application bytecode work space of the JVM to the software-implemented security module and an up-call stub configured to redirect up-calls from the software-implemented security module to the JVM.

25. The method of claim 20, wherein software code corresponding to the software-implemented security module is protected by one or more tamper resistance techniques.

* * * * *